United States Patent
Wang et al.

(10) Patent No.: US 9,092,700 B2
(45) Date of Patent: Jul. 28, 2015

(54) METHOD, SYSTEM AND APPARATUS FOR DETERMINING A SUBJECT AND A DISTRACTOR IN AN IMAGE

(71) Applicant: CANON KABUSHIKI KAISHA, Tokyo (JP)

(72) Inventors: Jue Wang, Macquarie Park (AU); Clement Fredembach, Ultimo (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/710,153

(22) Filed: Dec. 10, 2012

(65) Prior Publication Data

US 2013/0148854 A1   Jun. 13, 2013

(30) Foreign Application Priority Data

Dec. 12, 2011   (AU) ................................ 2011253982

(51) Int. Cl.
*G06K 9/40* (2006.01)
*G06K 9/78* (2006.01)
*G06K 9/46* (2006.01)
*G06K 9/62* (2006.01)

(52) U.S. Cl.
CPC ............. *G06K 9/78* (2013.01); *G06K 9/4671* (2013.01); *G06K 9/6284* (2013.01)

(58) Field of Classification Search
None
See application file for complete search history.

(56) References Cited

U.S. PATENT DOCUMENTS

| | | | |
|---|---|---|---|
| 6,941,323 B1 * | 9/2005 | Galperin | 1/1 |
| 7,231,076 B2 * | 6/2007 | Fu et al. | 382/131 |
| 7,593,602 B2 | 9/2009 | Stentiford | |
| 8,768,070 B2 * | 7/2014 | Gelfand et al. | 382/224 |
| 2006/0002630 A1 * | 1/2006 | Fu et al. | 382/294 |
| 2006/0002631 A1 * | 1/2006 | Fu et al. | 382/294 |
| 2006/0050993 A1 * | 3/2006 | Stentiford | 382/305 |
| 2007/0286526 A1 * | 12/2007 | Abousleman et al. | 382/284 |
| 2008/0317378 A1 | 12/2008 | Steinberg et al. | |
| 2009/0324103 A1 | 12/2009 | Gelfand et al. | |
| 2010/0124371 A1 * | 5/2010 | Jiang et al. | 382/162 |
| 2012/0218280 A1 | 8/2012 | Fredembach | |

OTHER PUBLICATIONS

IP Australia, Notice of Acceptance, dated Feb. 18, 2015, and Bibliographic Details, pp. 1-2, Australian Government.

* cited by examiner

*Primary Examiner* — Tsung-Yin Tsai
(74) *Attorney, Agent, or Firm* — Canon USA, Inc., IP Division

(57) ABSTRACT

A method of identifying a subject and a distractor in a target image is disclosed. The method receives a reference image comprising image content corresponding to image content of the target image. A first saliency map, which defines a distribution of visual attraction values identifying salient regions within the target image, and a second saliency map, which defines a distribution of visual attraction values identifying salient regions within the reference image, are determined. The method compares image content in salient regions of the first saliency map and the second saliency map. The subject is identified by a salient region of the target image sharing image content with a salient region of the reference image. The distractor is identified based on at least one remaining salient region of the target image.

18 Claims, 16 Drawing Sheets

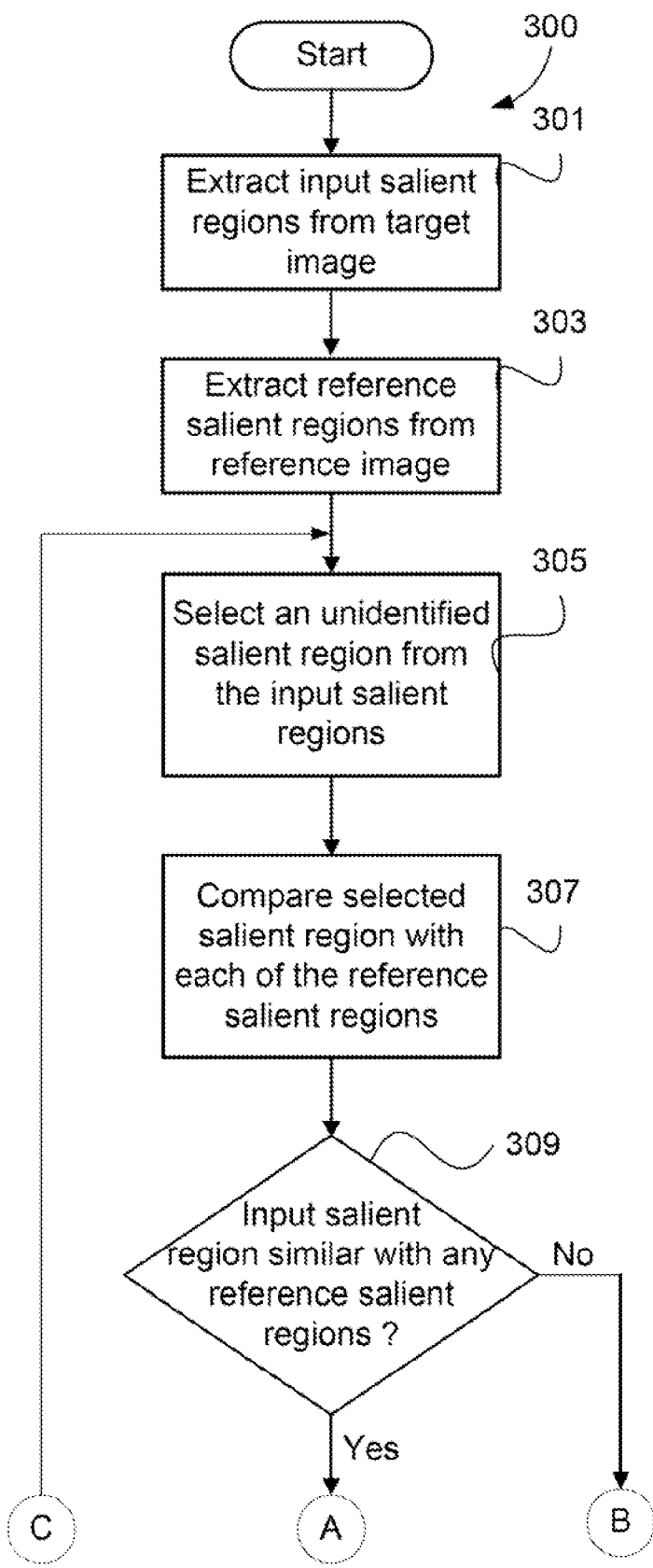
Fig. 3A
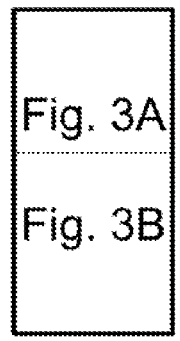

METHOD, SYSTEM AND APPARATUS FOR DETERMINING A SUBJECT AND A DISTRACTOR IN AN IMAGE

CROSS-REFERENCE TO RELATED PATENT APPLICATIONS

This application claims the right of priority under 35 U.S.C. §119 based on Australian Patent Application No. 2011253982, filed 12 Dec. 2011, which is incorporated by reference herein in its entirety as if fully set forth herein.

FIELD OF INVENTION

The present invention relates to image processing and, in particular, to enhancement of images. The present invention also relates to a method and apparatus for determining a subject and a distractor in an image, and to a computer program product including a computer readable medium having recorded thereon a computer program for determining a subject and a distractor in an image.

DESCRIPTION OF BACKGROUND ART

Knowing how to capture an image is not difficult. However, mastering photography has a steep learning curve. Creation of a good image involves many skills from preparing to capture the image to post-processing. It is almost impossible to master such skills without years of study and practice.

In order to encourage more people to take up photography and to assist beginner/amateur photographers to capture good images, many methods, such as auto-focus and auto-exposure, have been developed to improve image quality in every step of the image creation process.

Many methods exist for improving image quality by detecting and removing image artefacts, such as noise, blocking artefacts and motion blur. Such artefacts significantly degrade image quality. However, artefacts are not the most important deterministic factor for image quality. No matter how sharp or noise-free an image is, the image cannot be a good image if a subject/theme of the image is not well presented.

SUMMARY OF THE INVENTION

It is an object of the present invention to substantially overcome, or at least ameliorate, one or more disadvantages of existing arrangements.

According to one aspect of the present disclosure there is provided a method of identifying a subject and a distractor in a target image, said method comprising:

receiving at least one reference image comprising image content corresponding to image content of the target image;

determining a first saliency map for the target image, said first saliency map defining a distribution of visual attraction values identifying salient regions within the target image;

determining a second saliency map for the reference image, said second saliency map defining a distribution of visual attraction values identifying salient regions within the reference image;

comparing image content in at least one salient region identified in the first saliency map with image content of at least one salient region identified in the second saliency map; and identifying the subject of the target image based on the comparison, wherein the subject is identified by a salient region of the target image sharing image content with at least one salient region of the reference image, and wherein the distractor is identified based on at least one remaining salient region of the target image.

According to another aspect of the present disclosure there is provided an apparatus for identifying a subject and a distractor in a target image, said apparatus comprising:

means for receiving at least one reference image comprising image content corresponding to image content of the target image;

means for determining a first saliency map for the target image, said first saliency map defining a distribution of visual attraction values identifying salient regions within the target image;

means for determining a second saliency map for the reference image, said second saliency map defining a distribution of visual attraction values identifying salient regions within the reference image;

means for comparing image content in at least one salient region identified in the first saliency map with image content of at least one salient region identified in the second saliency map; and means for identifying the subject of the target image based on the comparison, wherein the subject is identified by a salient region of the target image sharing image content with at least one salient region of the reference image, and wherein the distractor is identified based on at least one remaining salient region of the target image.

According to still another aspect of the present disclosure there is provided a system for identifying a subject and a distractor in a target image, said system comprising:

a memory for storing data and a computer program;

a processor coupled to the memory for executing said computer program, said computer program comprising instructions for:

receiving at least one reference image comprising image content corresponding to image content of the target image;

determining a first saliency map for the target image, said first saliency map defining a distribution of visual attraction values identifying salient regions within the target image;

determining a second saliency map for the reference image, said second saliency map defining a distribution of visual attraction values identifying salient regions within the reference image;

comparing image content in at least one salient region identified in the first saliency map with image content of at least one salient region identified in the second saliency map; and identifying the subject of the target image based on the comparison, wherein the subject is identified by a salient region of the target image sharing image content with at least one salient region of the reference image, and wherein the distractor is identified based on at least one remaining salient region of the target image.

According to still another aspect of the present disclosure there is provided a computer readable medium having a computer program recorded thereon for identifying a subject and a distractor in a target image, said program comprising:

code for receiving at least one reference image comprising image content corresponding to image content of the target image;

code for determining a first saliency map for the target image, said first saliency map defining a distribution of visual attraction values identifying salient regions within the target image;

code for determining a second saliency map for the reference image, said second saliency map defining a distribution of visual attraction values identifying salient regions within the reference image;

code for comparing image content in at least one salient region identified in the first saliency map with image content of at least one salient region identified in the second saliency map; and code for identifying the subject of the target image based on the comparison, wherein the subject is identified by a salient region of the target image sharing image content with at least one salient region of the reference image, and wherein the distractor is identified based on at least one remaining salient region of the target image.

Other aspects of the invention are also disclosed.

BRIEF DESCRIPTION OF THE DRAWINGS

One or more embodiments of the invention will now be described with reference to the following drawings, in which:

FIGS. 3A and 3B together form a schematic flow diagram showing a method of identifying subject regions and distracting regions in a target image, as executed in the method of FIG. 1;

DETAILED DESCRIPTION OF EMBODIMENTS OF THE INVENTION

Figure 1:
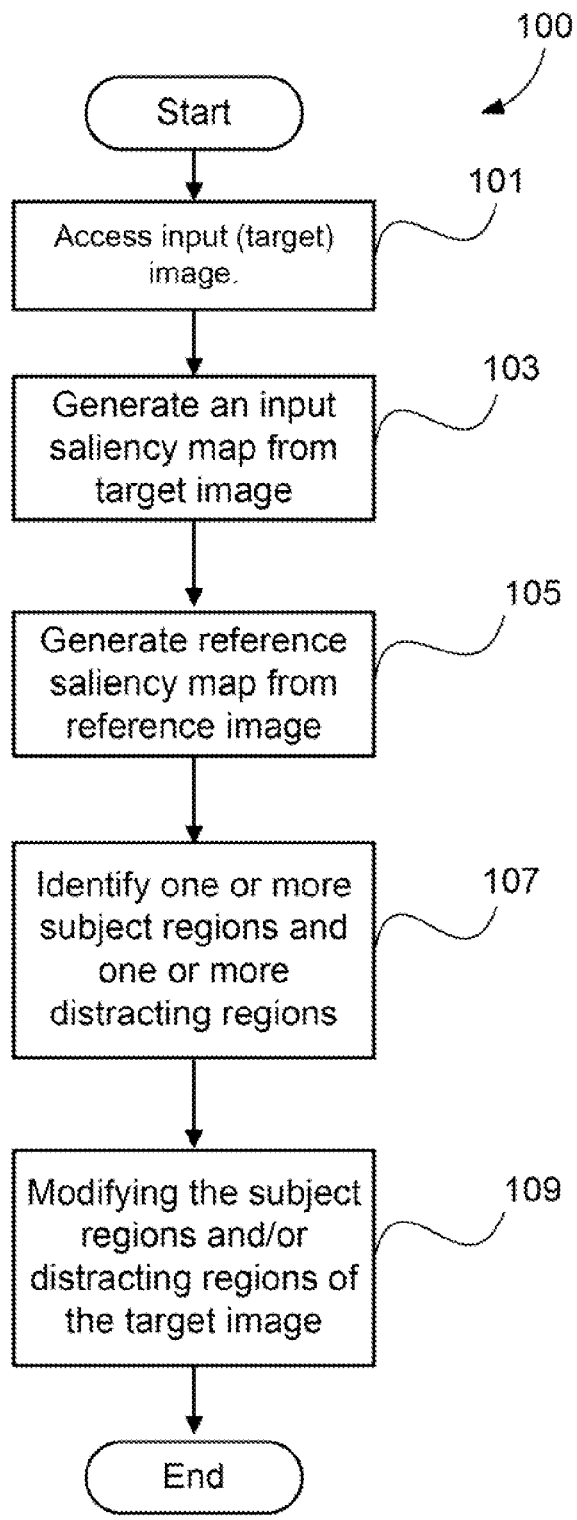
FIG. 1 is a schematic block diagram of a method of modifying an image.

Where reference is made in any one or more of the accompanying drawings to steps and/or features, which have the same reference numerals, those steps and/or features have for the purposes of this description the same function(s) or operation(s), unless the contrary intention appears.

When a photographer captures an image, he/she often wants to capture or express something in the image, which is defined as the intention of the photographer. However, due to the limited photographic skills/experience or the limitations of non-professional cameras, a beginner/amateur photographer may fail to present his/her intention of an image clearly. In this instance, observers of the image may be distracted by some unintended image components. In contrast, with years of experience, an experienced professional photographer knows much better how to attract attention of the observers to a place in the image where the intended subject is presented.

The terms subjects and subject regions as described below refer to regions of an image where attention of the observer is consistent with the intention of the photographer.

The terms distractors and distracting regions as described below refer to regions where the attention of the observer is inconsistent with the intention of the photographer. For example, a dog owner may wish to capture an image of the dog in a grass field. When the image is captured, a bird may happen to fly into the scene, so that the image has a dog in a grass field with a bird somewhere in the image. In this instance, the dog is the subject of the image, while the bird is the distractor.

Methods described below improve quality of an image captured by an amateur photographer by strengthening quality of subjects and themes of the image. Distracting regions may be attenuated, so that presentation of the subject in the image is clearer.

The described methods learn from good examples. In order to improve quality of a "target image" captured by a beginner/amateur photographer, a high quality professional-level image ("reference image"), with the same or similar content, may be used as a good example. The target image may be modified based on the reference image.

Figure 12A:
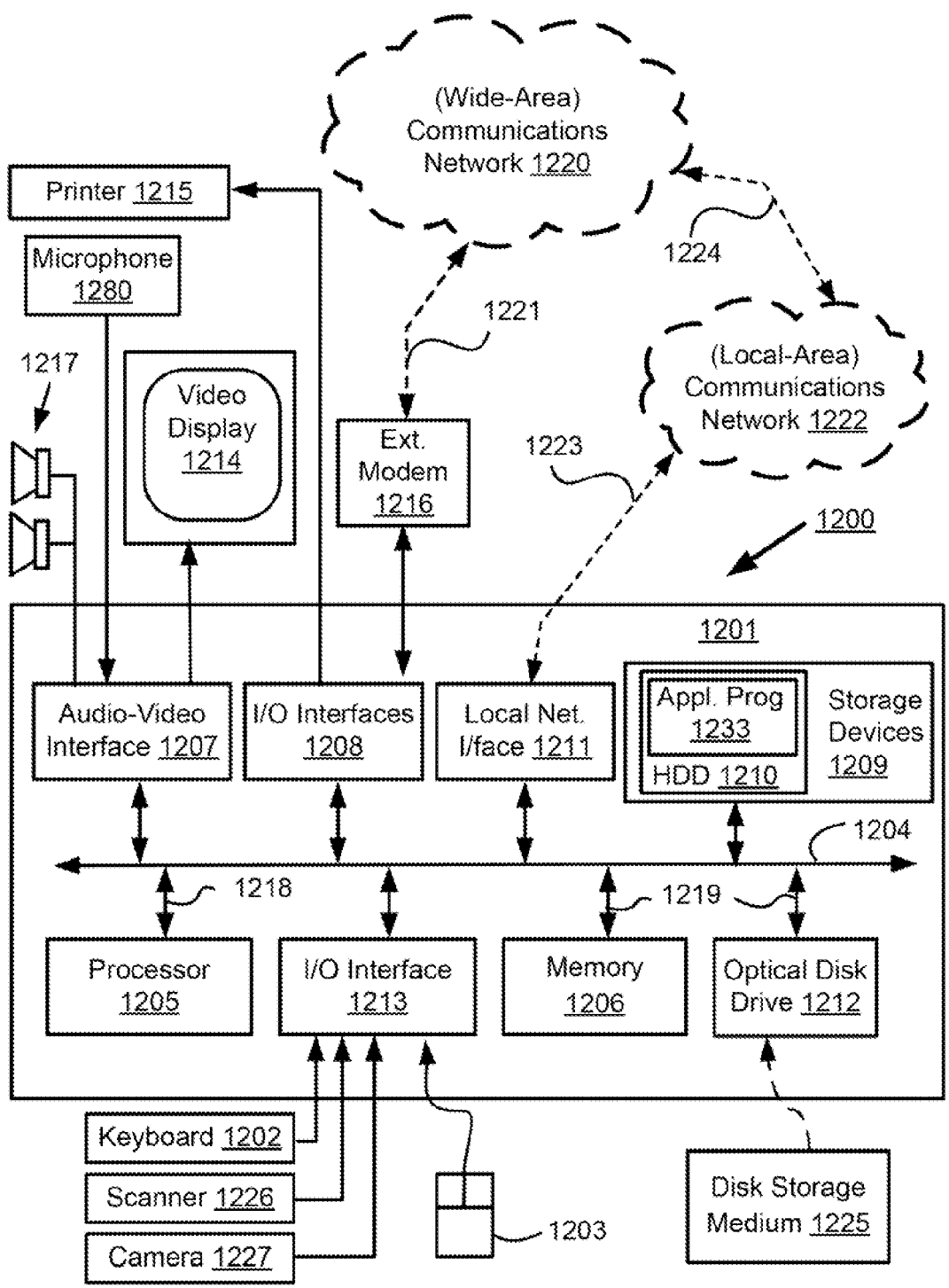
FIGS. 12A and 12B form a schematic block diagram of a general purpose computer system upon which arrangements described may be practiced.
Figure 12B:
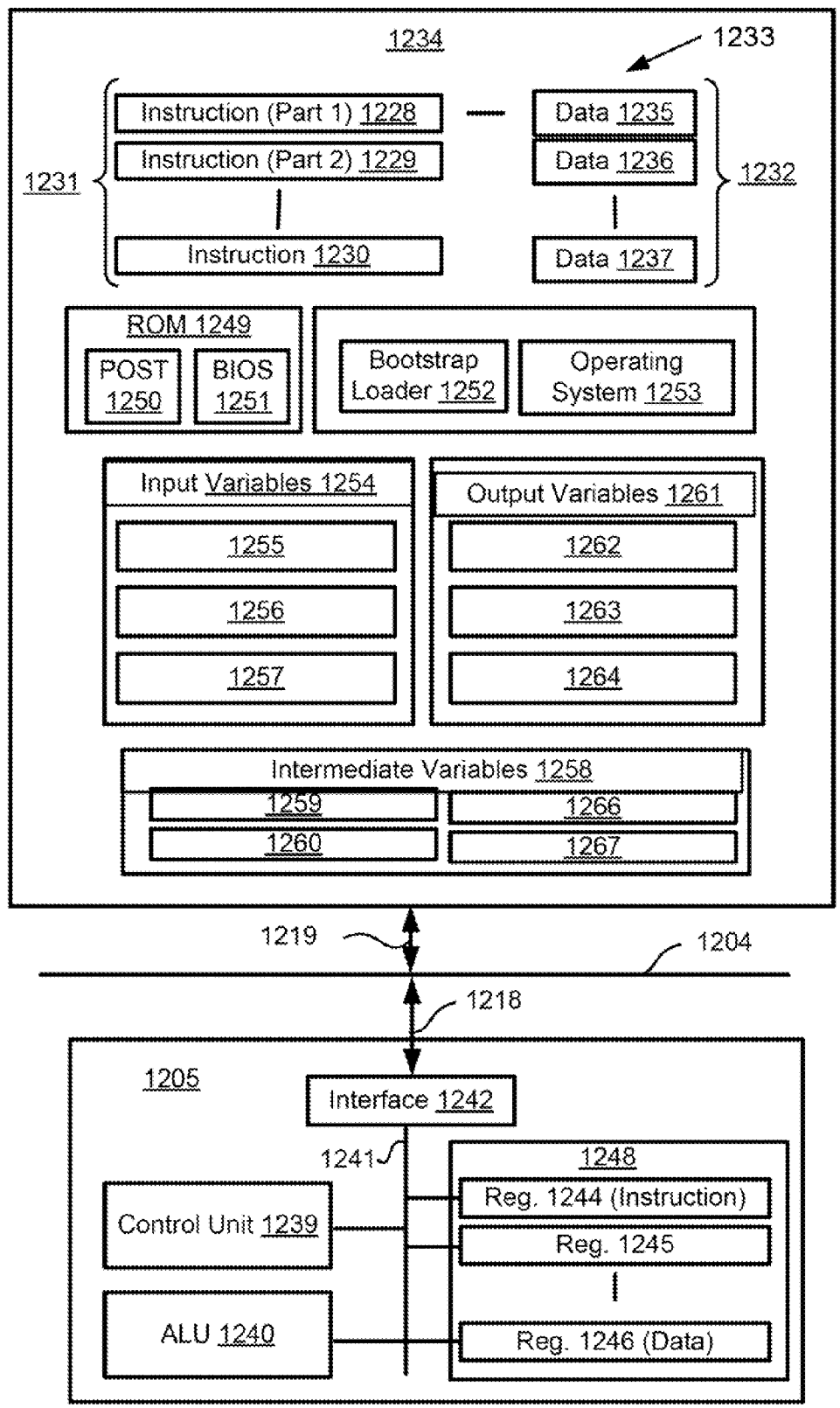

FIGS. 12A and 12B depict a general-purpose computer system 1200, upon which the described methods can be practiced. The methods to be described may also be practiced on other devices such as, for example, a digital camera, a mobile phone or a portable media player, in which processing resources are limited.

As seen in FIG. 12A, the computer system 1200 includes: a computer module 1201; input devices such as a keyboard 1202, a mouse pointer device 1203, a scanner 1226, a camera 1227, and a microphone 1280; and output devices including a printer 1215, a display device 1214 and loudspeakers 1217. An external Modulator-Demodulator (Modem) transceiver device 1216 may be used by the computer module 1201 for communicating to and from a communications network 1220 via a connection 1221. The communications network 1220 may be a wide-area network (WAN), such as the Internet, a cellular telecommunications network, or a private WAN. Where the connection 1221 is a telephone line, the modem 1216 may be a traditional "dial-up" modem. Alternatively, where the connection 1221 is a high capacity (e.g., cable) connection, the modem 1216 may be a broadband modem. A wireless modem may also be used for wireless connection to the communications network 1220.

The computer module 1201 typically includes at least one processor unit 1205, and a memory unit 1206. For example, the memory unit 1206 may have semiconductor random access memory (RAM) and semiconductor read only memory (ROM). The computer module 1201 also includes an number of input/output (I/O) interfaces including: an audio-video interface 1007 that couples to the video display 1214, loudspeakers 1217 and microphone 1280; an I/O interface 1013 that couples to the keyboard 1202, mouse 1203, scanner 1226, camera 1227 and optionally a joystick or other human interface device (not illustrated); and an interface 1208 for the external modem 1216 and printer 1215. In some implementations, the modem 1216 may be incorporated within the computer module 1201, for example within the interface 1208. The computer module 1201 also has a local network interface 1211, which permits coupling of the computer system 1200 via a connection 1223 to a local-area communications network 1222, known as a Local Area Network (LAN). As illustrated in FIG. 12A, the local communications network 1222 may also couple to the wide network 1220 via a connection 1224, which would typically include a so-called "firewall" device or device of similar functionality. The local network interface 1211 may comprise an Ethernet circuit card, a Bluetooth™ wireless arrangement or an IEEE 802.11 wireless arrangement; however, numerous other types of interfaces may be practiced for the interface 1211.

The I/O interfaces 1208 and 1213 may afford either or both of serial and parallel connectivity, the former typically being implemented according to the Universal Serial Bus (USB) standards and having corresponding USB connectors (not illustrated). Storage devices 1209 are provided and typically include a hard disk drive (HDD) 1210. Other storage devices such as a floppy disk drive and a magnetic tape drive (not illustrated) may also be used. An optical disk drive 1212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1200.

The components 1205 to 1213 of the computer module 1201 typically communicate via an interconnected bus 1204 and in a manner that results in a conventional mode of operation of the computer system 1200 known to those in the relevant art. For example, the processor 1205 is coupled to the system bus 1204 using a connection 1218. Likewise, the memory 1206 and optical disk drive 1212 are coupled to the system bus 1204 by connections 1219. Examples of computers on which the described arrangements can be practised include IBM-PC's and compatibles, Sun Sparcstations, Apple Mac™ or a like computer systems.

Methods described below may be implemented using the computer system 1200 wherein the processes of FIGS. 1 to 12, to be described, may be implemented as one or more software application programs 1233 executable within the computer system 1200. In particular, the steps of the described methods are effected by instructions 1231 (see FIG. 12B) in the software 1233 that are carried out within the computer system 1200. The software instructions 1231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 1233 is typically stored in the HDD 1210 or the memory 1206.

The software is loaded into the computer system 1200 from the computer readable medium, and then executed by the computer system 1200. Thus, for example, the software 1233 may be stored on an optically readable disk storage medium (e.g., CD-ROM) 1225 that is read by the optical disk drive 1212. A computer readable medium having such software or computer program recorded on the computer readable medium is a computer program product. The use of the computer program product in the computer system 1200 preferably effects an advantageous apparatus for implementing the described methods.

In some instances, the application programs 1233 may be supplied to the user encoded on one or more CD-ROMs 1225 and read via the corresponding drive 1212, or alternatively may be read by the user from the networks 1220 or 1222. Still further, the software can also be loaded into the computer system 1200 from other computer readable media. Computer readable storage media refers to any non-transitory tangible storage medium that provides recorded instructions and/or data to the computer system 1200 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 1201. Examples of transitory or non-tangible computer readable transmission media that may also participate in the provision of software, application programs, instructions and/or data to the computer module 1201 include radio or infra-red transmission channels as well as a network connection to another computer or networked device, and the Internet or Intranets including e-mail transmissions and information recorded on Websites and the like.

The second part of the application programs 1233 and the corresponding code modules mentioned above may be executed to implement one or more graphical user interfaces (GUIs) to be rendered or otherwise represented upon the display 1214. Through manipulation of typically the keyboard 1202 and the mouse 1203, a user of the computer system 1200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1217 and user voice commands input via the microphone 1280.

FIG. 12B is a detailed schematic block diagram of the processor 1205 and a "memory" 1234. The memory 1234 represents a logical aggregation of all the memory modules (including the HDD 1209 and semiconductor memory 1206) that can be accessed by the computer module 1201 in FIG. 12A.

When the computer module 1201 is initially powered up, a power-on self-test (POST) program 1250 executes. The POST program 1250 is typically stored in a ROM 1249 of the semiconductor memory 1206 of FIG. 12A. A hardware device such as the ROM 1249 storing software is sometimes referred to as firmware. The POST program 1250 examines hardware within the computer module 1201 to ensure proper functioning and typically checks the processor 1205, the memory 1234 (1209, 1206), and a basic input-output systems software (BIOS) module 1251, also typically stored in the ROM 1249, for correct operation. Once the POST program 1250 has run successfully, the BIOS 1251 activates the hard disk drive 1210 of FIG. 12A. Activation of the hard disk drive 1210 causes a bootstrap loader program 1252 that is resident on the hard disk drive 1210 to execute via the processor 1205. This loads an operating system 1253 into the RAM memory 1206, upon which the operating system 1253 commences operation. The operating system 1253 is a system level application, executable by the processor 1205, to fulfil various high level functions, including processor management, memory management, device management, storage management, software application interface, and generic user interface.

The operating system 1253 manages the memory 1234 (1209, 1206) to ensure that each process or application running on the computer module 1201 has sufficient memory in which to execute without colliding with memory allocated to another process. Furthermore, the different types of memory available in the system 1200 of FIG. 12A must be used properly so that each process can run effectively. Accordingly, the aggregated memory 1234 is not intended to illustrate how particular segments of memory are allocated (unless otherwise stated), but rather to provide a general view of the memory accessible by the computer system 1200 and how such is used.

As shown in FIG. 12B, the processor 1205 includes a number of functional modules including a control unit 1239, an arithmetic logic unit (ALU) 1240, and a local or internal memory 1248, sometimes called a cache memory. The cache memory 1248 typically includes a number of storage registers 1244-1246 in a register section. One or more internal busses 1241 functionally interconnect these functional modules. The processor 1205 typically also has one or more interfaces 1242 for communicating with external devices via the system bus 1204, using a connection 1218. The memory 1234 is coupled to the bus 1204 using a connection 1219.

The application program 1233 includes a sequence of instructions 1231 that may include conditional branch and loop instructions. The program 1233 may also include data 1232 which is used in execution of the program 1233. The instructions 1231 and the data 1232 are stored in memory locations 1228, 1229, 1230 and 1235, 1236, 1237, respectively. Depending upon the relative size of the instructions 1231 and the memory locations 1228-1230, a particular instruction may be stored in a single memory location as depicted by the instruction shown in the memory location 1230. Alternately, an instruction may be segmented into a number of parts each of which is stored in a separate memory location, as depicted by the instruction segments shown in the memory locations 1228 and 1229.

In general, the processor 1205 is given a set of instructions which are executed therein. The processor 1205 waits for a subsequent input, to which the processor 1205 reacts to by executing another set of instructions. Each input may be provided from one or more of a number of sources, including data generated by one or more of the input devices 1202, 1203, data received from an external source across one of the networks 1220, 1202, data retrieved from one of the storage devices 1206, 1209 or data retrieved from a storage medium 1025 inserted into the corresponding reader 1212, all depicted in FIG. 12A. The execution of a set of the instructions may in some cases result in output of data. Execution may also involve storing data or variables to the memory 1234.

The described methods use input variables 1254, which are stored in the memory 1234 in corresponding memory locations 1255, 1256, 1257. The described methods produce output variables 1261, which are stored in the memory 1234 in corresponding memory locations 1262, 1263, 1264. Intermediate variables 1258 may be stored in memory locations 1259, 1260, 1266 and 1267.

Referring to the processor 1205 of FIG. 12B, the registers 1244, 1245, 1246, the arithmetic logic unit (ALU) 1240, and the control unit 1239 work together to perform sequences of micro-operations needed to perform "fetch, decode, and execute" cycles for every instruction in the instruction set making up the program 1233. Each fetch, decode, and execute cycle comprises:

(a) a fetch operation, which fetches or reads an instruction 1231 from a memory location 1228, 1229, 1230;

(b) a decode operation in which the control unit 1239 determines which instruction has been fetched; and (c) an execute operation in which the control unit 1239 and/or the ALU 1240 execute the instruction.

Thereafter, a further fetch, decode, and execute cycle for the next instruction may be executed. Similarly, a store cycle may be performed by which the control unit 1039 stores or writes a value to a memory location 1232.

Each step or sub-process in the processes of FIGS. 1 to 9 is associated with one or more segments of the program 1233 and is performed by the register section 1244, 1245, 1247, the ALU 1240, and the control unit 1239 in the processor 1205 working together to perform the fetch, decode, and execute cycles for every instruction in the instruction set for the noted segments of the program 1233.

The described methods may alternatively be implemented in dedicated hardware such as one or more integrated circuits performing the functions or sub functions of described methods. Such dedicated hardware may include graphic processors, digital signal processors, or one or more microprocessors and associated memories.

Figure 11:
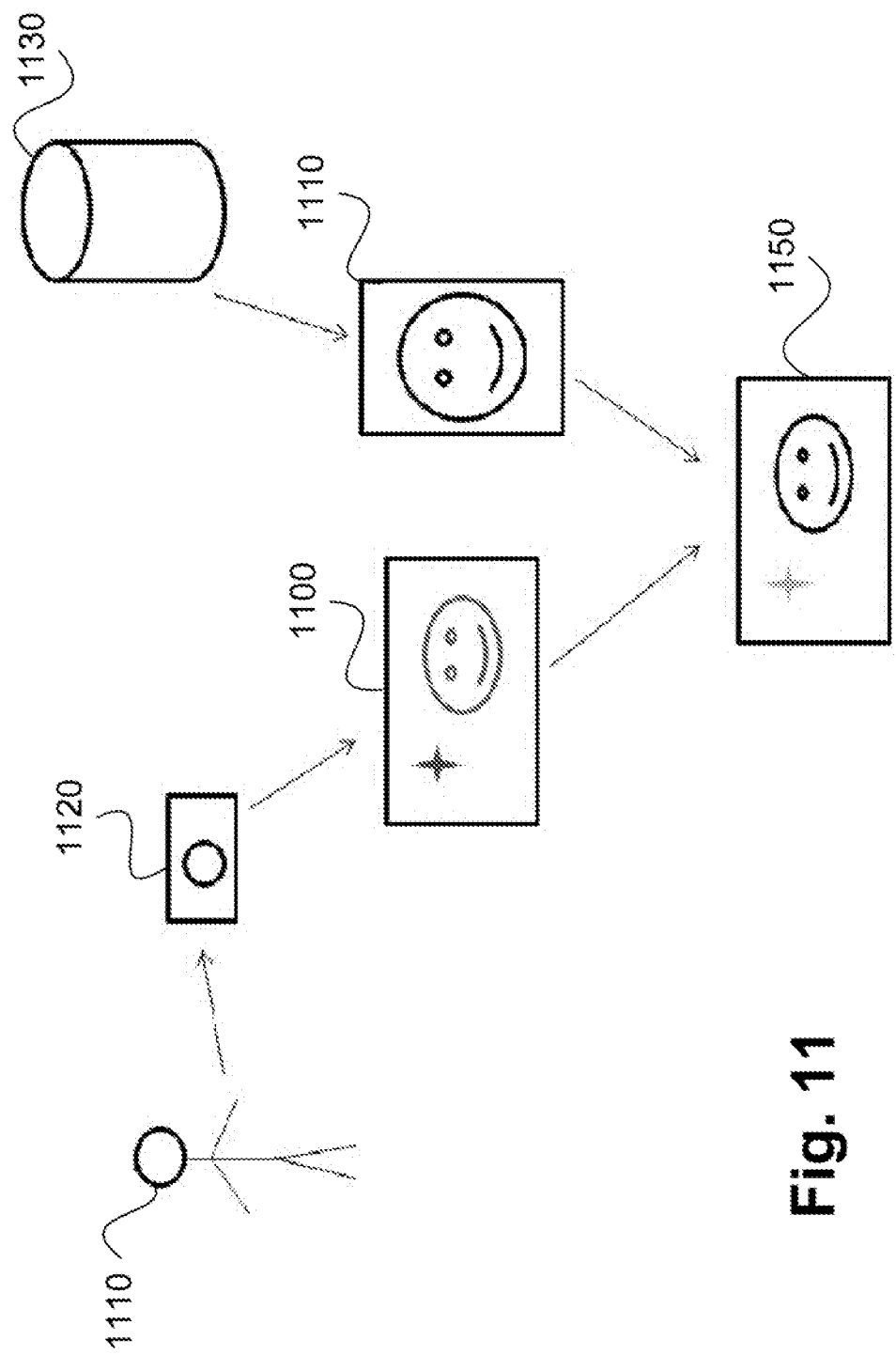
FIG. 11 is a context diagram showing one application of the method of FIG. 1.

As an example, FIG. 11 shows a photographer 1110 who uses a camera 1120 to capture an image 1100. The image 1100 contains subjects and may contain some distractors. In the example, the photographer 1110 is not happy with the image 1100 he/she has captured. However, the photographer 1110 does not want to modify the image 1100 by himself/herself, possibly since the photographer does not know how to modify the image 1100. It may also be merely time consuming for the photographer to modify the image. The described methods modify (or enhance) quality of the image 1100 based on a reference image 1110, and output a modified (or enhanced) image 1150. The reference image 1110 may be obtained from an image database 1130 contained, for example, within the memory 1234. The reference image 1110 is an image with which the photographer 1110 is satisfied. The image database 1130 may be the photographer's collection of images. Alternatively, the image database 1130 may be a collection of images owned and controlled by a company or the like. In still a further alternative, the image database 1130 may be an image database stored within a remote server 1295, for example, connected to the network 1220.

FIG. 1 is a flow diagram showing a method 100 of modifying an image. The image may be modified to enhance the quality of the image. The method 100 may be implemented as one or more software code modules of the software application program 1233 resident in the memory 1234 and being controlled in its execution by the processor 1205. Although steps 101 to 109 of the method 100 are shown in FIG. 1 as being executed sequentially, one or more steps of the method 100 may be executed in parallel. For example, steps 103 or 105 may be executed in parallel.

The method 100 begins at image access step 101, where the processor 1205 is used to access an input image to be enhanced. The input image may have been captured by a user and stored within the memory 1234. The input image will be referred to below as the "target image".

Also at step 101, the processor 1205 is used for receiving at least one reference image by accessing the reference image from the memory 1234. The reference image may be in the form of a high-quality professional image comprising semantically similar image content corresponding to image content of the target image. For example, if the target image is a portrait photo of a person, then the reference image may also be a portrait photo of a person, although the reference image may be a portrait of a different person.

Alternatively, the reference image may not be a professional image. For example, the reference image may be an image with which the user is satisfied. For example, the reference image may be another image captured by the user and that the user likes.

The method 100 improves the target image based on the reference image. The reference image may be selected from a number of such reference images stored within the memory 1234. Different reference images may result in different enhanced target images. For example, the target image may contain a dog and a bird. If the reference image contains a dog but no bird, then in accordance with the method 100 the dog in the target image is identified as the subject and the bird is identified as a distractor. If the reference image contains a bird but no dog, then the dog is identified as a distractor but the bird will be identified as a subject. Accordingly, the reference image is an image that the user likes.

The reference image may be provided by the user. In one implementation, the reference image may be selected by the user based on which reference image he/she wants to use to modify the target image. Alternatively, as described below, the reference image may be automatically or semi-automatically retrieved from an image database.

The saliency level of an image item, such as an object, a pixel, or a region, is the possibility that the image item stands out more or attracts more attention relative to neighbouring items. A saliency map may be used to measure how strongly each pixel/region can attract attention of an observer when the observer looks at an image. In a saliency map, a large value indicates that a corresponding pixel/region strongly attracts attention of the observer. Conversely, a small value indicates that a corresponding pixel/region does not attract attention of the observer.

Then at saliency map generation step 103, the processor 1205 is used to generate an input saliency map from the target image. A saliency map is a region of interest map. As described in detail below, such a saliency map measures how strongly each part of an image attracts attention of an observer. The input saliency map may be stored within the memory 1234. A method 200 of generating a saliency map, as executed at step 103, will be described in detail below with reference to FIG. 2A.

At saliency map generation step 105, the processor 1205 generates a reference saliency map from the reference image. The reference saliency map may be stored within the memory 1234. The reference saliency map is generated in accordance with the method 200 described in detail below with reference to FIG. 2.

Alternatively, any suitable region of interest (ROI) detection method may be applied to the target image at step 101 to predict where people look in the target image.

The method 100 continues at subject and distractor identification step 107, where the processor 1205 is used to perform the step of identifying one or more subject regions representing the subject of the target image. Also at step 107, the processor 1205 is used to identify one or more distracting regions identifying any distractors in the target image. The distracting regions and subject regions may be identified by detecting "input salient regions" (i.e., salient regions of the target image) and reference salient regions (i.e., salient regions of the reference image) from the input saliency map and the reference saliency map, respectively, and comparing the detected salient regions. If the reference image is a high-quality professional image, it is likely that the reference image is free of distracting regions. Thus, the salient regions of the reference saliency map are the subjects of the reference image. Furthermore, since the reference image has similar content to the target image, the subjects of the target and reference images should have similar image properties, such as colour and texture. Therefore, if a salient region in the target image has similar properties to any of the salient regions in the reference image, then the salient region in the target region is identified as a subject region of the input image. Otherwise, the salient region in the target image is identified as a distracting region. A method 300 of identifying subject regions and distracting regions in the target image, as executed at step 107, will be described in detail below with reference to FIGS. 3A and 3B.

Even if some reference salient regions are not free of distracting regions (i.e. the reference image contains distractors), the subject and distractor identification step 107 will still work. The possibility of two images having the same types of distractors is very small. Thus, in the subject and distractor identification step 107, a distracting region in the target image is unlikely to be similar with either the subject regions or the distracting regions in the reference image.

Once the subjects and distracting regions of the target image have been identified, the method 100 proceeds to image modification step 109. At step 109, the processor 1205 is used to improve the quality of the target image by modifying the subject regions and/or distracting regions of the target image. The processor 1205 is used to enhance the quality of the subject regions and/or attenuates the distracting regions, outputting a modified version of the target (or input) image. At step 107, the content of the target image is not changed. For example, regions are not removed from the target image. However, the processor 1205 is used to change how the content of the target image is presented in the target image. A method 400 of modifying an image, as executed at step 109, will be described in more detail below with reference to FIG. 4.

The method 200 of generating a saliency map, as executed at step 103, will be described in detail below with reference to FIG. 2A. The method 200 may be implemented as one or more software code modules resident on the memory 1234 and being controlled its execution by the processor 1205. The method 200 is described below with reference to generating the saliency map at step 103 for the target image. The method 200 is similarly performed at step 105 to generate the saliency map for the reference image.

The method 200 may be implemented using biologically inspired features, such as colour contrast, luminance contrast, and texture orientations, to determine saliency of regions. Further, the method 200 may also use image frequency information analysis and machine learning methods to determine saliency of regions. In accordance with the method 200, a normalized saliency map of the same size as the target image is generated.

The size of salient regions effects image saliency prediction. In particular, when an image is displayed horizontally subtending 30° of viewing angle, image observers tend to mainly fixate on image regions that comprise between 3% and 5% of the whole size of the target image. Image observers rarely look at image regions greater than 8% of the image size. In one implementation of the method 200, region size may be integrated into the prediction of salient regions to improve the performance of the method 200.

The method 200 begins at step 201, where the processor 120 is used for receiving the target (or input) image stored in the memory 1234.

Then at the next step 203, the processor 1205 is used to initiate the value of a window size w_size which will be used at a following saliency map calculation step 210. In particular, at step 203, the processor 1205 is used to set the window size w_size equal to an initial value, Init_value. The window corresponds to a portion of the target image.

At saliency map calculation step 205, the processor 1205 is used to perform steps for iteratively determining a new saliency map M for the target image based on a given window size w_size. The window size w_size may be stored, for example, as a variable within the memory 1234. In each iteration, the window size w_size is incremented by a certain amount s_increment, and the iteration terminates when the window size is above a threshold T_size. Accordingly, for each given window size w_size, the processor 1205 is used to determine a new saliency map M based on the value of w_size, as will be described in detail below. The saliency maps M may be stored within the memory 1234.

Then at decision step 207, if the window size w_size is greater than the threshold T_size then the method 200 proceeds to step 209. Otherwise, the method 200 proceeds to incrementing step 211. At step 211, the processor 1205 used to increment the window size w_size (i.e., w_size=w_size+s_increment).

At saliency map combination step 209, the input saliency maps generated at step 205 for each window size w_size are combined into one saliency map, defining a distribution of visual attraction values identifying salient regions within the target image. The saliency map may be referred to as a first saliency map and may be stored within the memory 1234.

Similarly, when generating the saliency map for the reference image, the method 200 combines saliency maps generated at step 205 for each window size w_size into one reference saliency map ("a second saliency map"), defining a distribution of visual attraction values identifying salient regions within the reference image. The reference saliency map may also be stored within the memory 1234.

In one implementation, the window corresponding to a portion of the target image, or the representation image, is a rectangular region denoted as [h, wid], where h represents height of the window, and wid the width of the window. The initial value Init_value of w_size is [0.1*im_height, 0.1*im_width], where im_height and im_width represent height and width of the target (or input) image, respectively. The window size increment s_increment may be set to [0.05*im_height, 0.05*im_width]. The window size threshold T_size is set to [0.35*im_height, 0.35*im_width]. The window may take other forms. For example, the window may be elliptical, and the lengths of the two axis may be determined based on an aspect ratio of the target image.

For each given window size w_size, at step 205, the processor 1205 is used to determine a new saliency map M based on the value of given window size w_size. The saliency value of each pixel of the target image within the window is determined by a difference between the pixel and a neighbouring region. In one implementation, the pixel values are converted into CIELab colour space. In this instance, the value of a pixel and the value of the neighbouring region of the pixel in each colour channel are compared. In the saliency map M, the value of each pixel (x, y) is determined in accordance with Equation. (1), as follows:

$$M(x, y) = \sqrt{\sum_{i=1}^{3} \left(C_i(x, y) - \overline{C_i^{w\_size}(x, y)}\right)^2} \tag{1}$$

where $C_i(x,y)$ (i=1, 2, 3) is the pixel value in the colour channel i, and $\overline{C_i^{w\_size}*x,y)}$ (i=1, 2, 3) is the average value in the colour channel i of all the pixels in the rectangular region defined by the window size w_size and centered at pixel (x,y).

After all the pixel values in the saliency map M are obtained, the saliency map M is normalized so that the sum of the salient regions M is equal to one (1).

When all the saliency maps are determined based on different window sizes, at step 209, the processor 1205 is used to assign each saliency map a different weight based on the corresponding window size. Also at step 209, the processor 1205 is used to combine the weighted saliency maps. The weight of each saliency map may be obtained according to a graph 250 shown in FIG. 2B. The x-axis 251 of the graph 250 corresponds to the percentage per of the window region in the target image, and may be determined in accordance with Equation. (2), as follows:

$$per = \frac{h * wid}{im\_height * im\_width} \tag{2}$$

where h, wid, im_height, im_width respectively represent height and width of the window, and height and width of the target (or reference) image.

The weight w of each window size may be determined according to the graph 250.

Figure 2A:
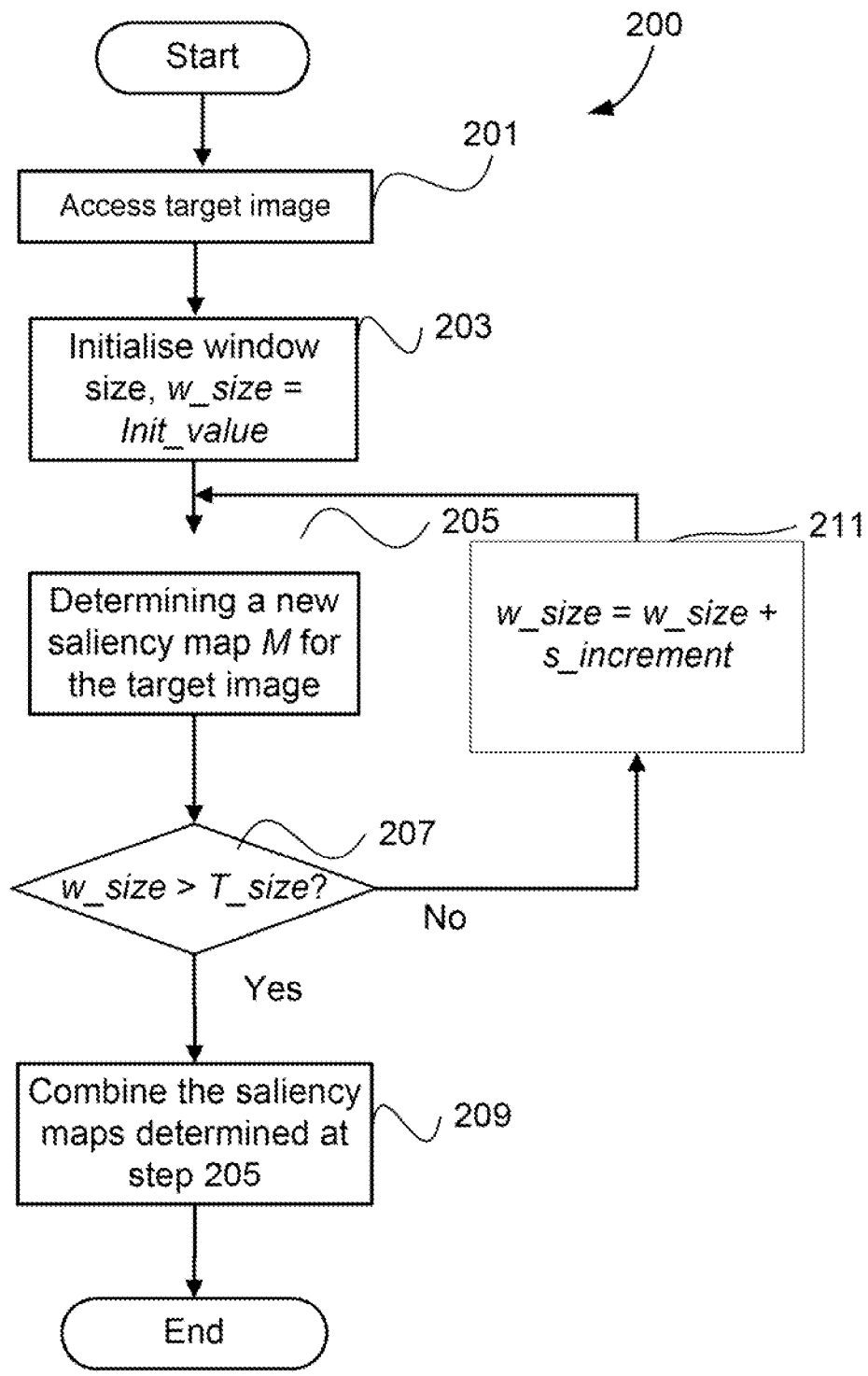
FIG. 2A is a schematic flow diagram showing a method of generating a saliency map, as executed in the method of FIG. 1.
Figure 2B:
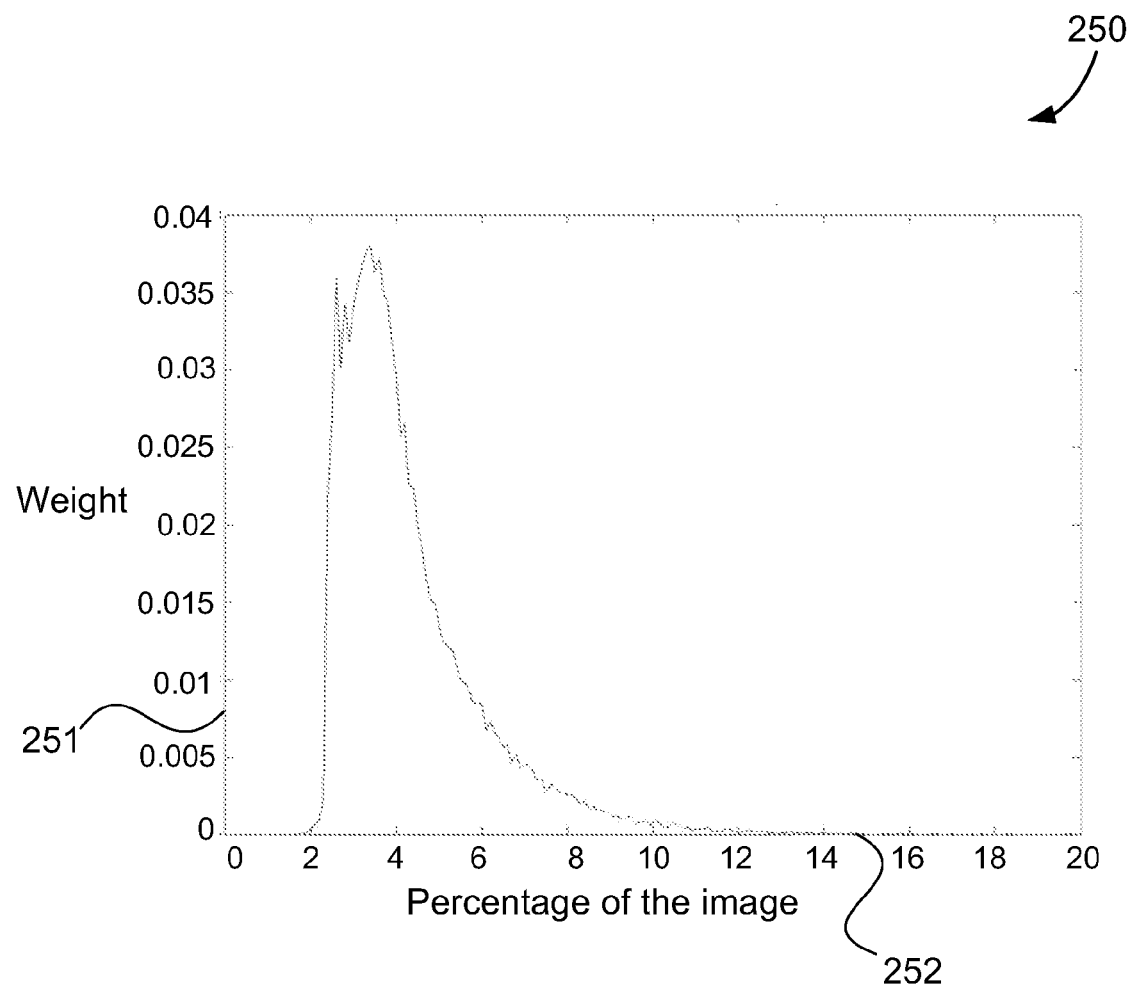
FIG. 2B is a diagram which may be used in the saliency map generation method of FIG. 2A.

A final output saliency map S may be determined at step 209 in accordance with Equation. (3), as follows:

$$S = \sum_i w_i * M_i \tag{3}$$

where $M_i$ is the saliency map calculated based on the window size $w\_size_i$, and $w_i$ is the corresponding weight of the window size $w\_size_i$ from the graph 250 shown in FIG. 2B.

Figure 3B:
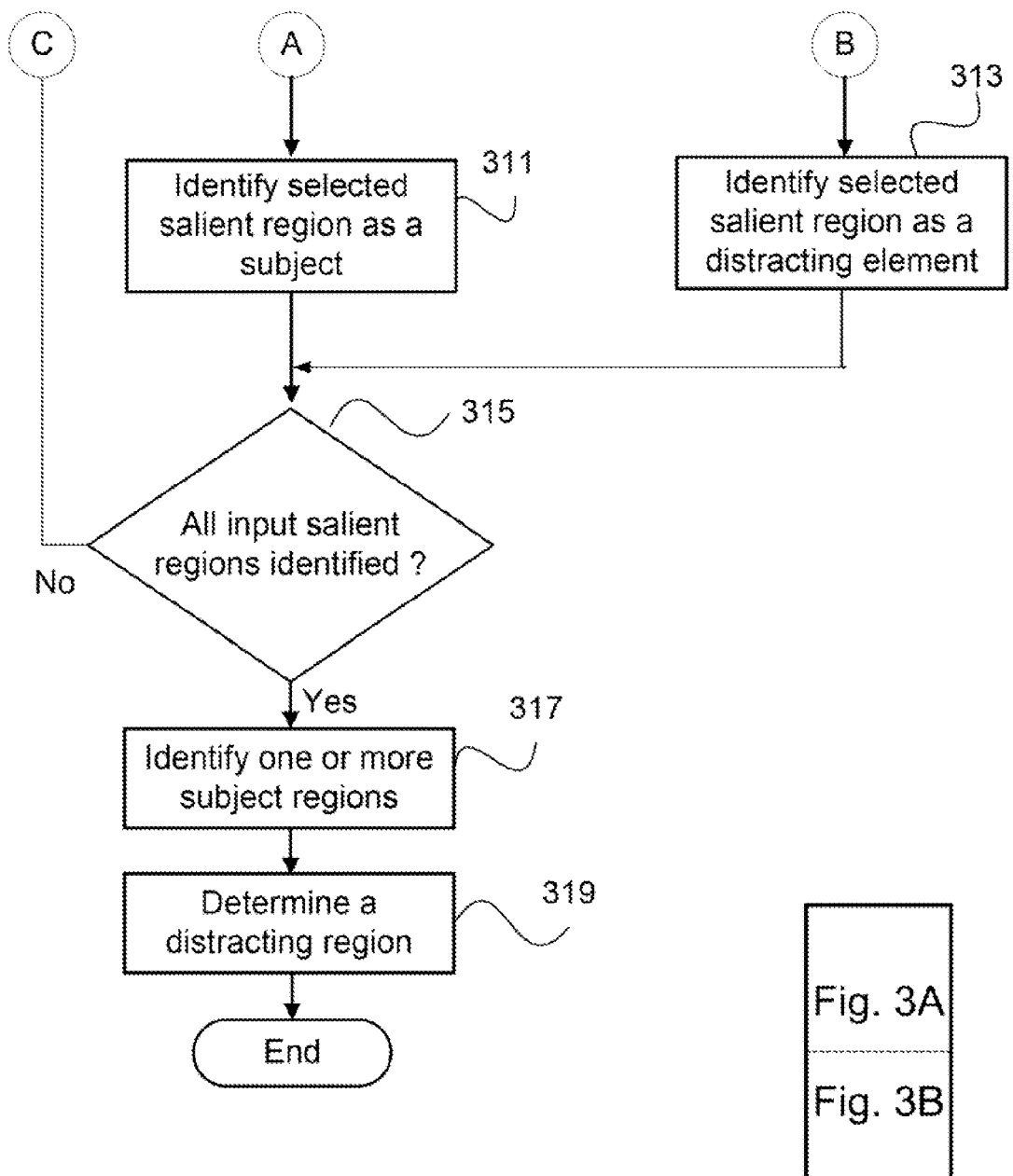

The method 300 of identifying subject regions and distracting regions in the target image, as executed at step 107, will be described in detail below with reference to FIGS. 3A and 3B. The method 300 may be implemented as one or more software code modules of the software application program 1233 resident in the memory 1234 and being controlled in its execution by the processor 1205. Although steps 301 to 319 of the method 100 are shown in FIGS. 3A and 3B, as being executed sequentially, one or more steps of the method 300 may be executed in parallel. For example, steps 301 and 303 may be executed in parallel.

The method 300 identifies subjects and distracting regions in the target image by comparing image content in at least one input salient region of the target image and at least one salient region in the reference image.

The method 300 begins at extraction step 301, where the processor 1205 is used to extract the input salient regions from the target image based on the input saliency map determined at 209 (the "first saliency map").

At extraction step 301, the method 300 receives two inputs in the form of an image I (i.e., the target image), and a saliency map SM (i.e, the input saliency map determined at step 103) of the image I. The processor 1205 is used to determine a binary saliency map SR containing salient regions in the image I. The binary saliency map SR is determined by binarising the saliency map SM (i.e., the input saliency map stored within memory 1234). Again, the binary saliency map SR may be stored within the memory 1234.

The binary saliency map SR is then used as a mask to extract the salient regions in the image I. In one implementation, the saliency map SR is determined in accordance with Equation. (4), as follows:

$$SR(x, y) = I(x, y) * \delta(x, y) \quad (4)$$

where $$\delta(x, y) = \begin{cases} 1 & \text{if } SM(x, y) \geq \gamma \\ 0 & \text{if } SM(x, y) < \gamma \end{cases}$$

where *(x, y) is the value of pixel (x, y) in the image/map *. Further, the threshold γ is a salient region map binarization threshold. The threshold γ may be a constant threshold, and the threshold γ may be set differently for different images or different types of images. In one implementation, for each image, the threshold γ may be set so that 30% of the pixels in the saliency map SM are above the threshold γ.

In the binary saliency map SR, non-zero valued pixels form one or more disconnected regions, and each region S is a salient region of the input image I (i.e., the target image stored within memory 1234).

Then at extraction step 303, the processor 1205 is used to extract the reference salient regions from the reference image stored within memory 1234 based on the reference saliency map (i.e., the "second saliency map" determined at step 209). The reference salient regions are extracted at step 303 using Equation (4) as above, in a similar manner to the extraction of the input salient regions as extracted at step 301.

At region selection step 305, the processor 1205 is used to randomly select an unidentified salient region S from the input salient regions determined at step 301. Alternatively, an unidentified region S may be selected at 305 from the input salient regions based on a pre-determined order. For example, the region S may be selected in ascending order of coordinate values of center of the salient region S compared to the other input salient regions.

Then at region comparison step 307, the processor 1205 is used to perform the step of comparing image content in the selected input salient region S (i.e., as identified in the target saliency map) with image content of at least one salient region in the reference saliency map. In accordance with the method 300, the processor 1205 is used to compare the similarity between the input salient region S selected at step 305 and each of the reference salient regions. Step 307 will be described in more detail below.

At decision step 309, the processor 1205 is used to determine the similarity between the selected input salient region S and the reference salient regions. If the selected input salient region S is similar to any of the reference salient regions, then the method 300 proceeds to identification step 311 where the selected salient region S is identified as a subject. Otherwise, the selected input salient region S is identified as a distracting region.

At determining step 317, the processor 1205 is used to identify one or more subject regions representing a union of the input salient regions that are identified as subjects at step 311. The subject regions may be stored within the memory 1234.

Then at determining step 319, the processor 1205 is used to determine one or more distracting regions as a union of all the input salient regions that are identified as distracting regions. Again, the distracting region determined at step 319 may be stored within the memory 1234.

Accordingly, the processor 1205 is used to perform steps for identifying the subject of the target image based on the comparison performed at step 307. The subject is identified based on the selected salient region S of the target image sharing image content with at least one salient region of the reference image. Further, the distracting region is identified based on at least one remaining salient region of the target image. Any suitable method may be used for of comparing the similarity between two regions at step 307. In one implementation, normalized cross-correlation and colour histograms may be used to compare the similarity between the selected input salient region S and the reference salient region at step 307. For example, to determine the normalized cross-correlation of two regions, the two regions are resized to the same size and shape, and the correlation coefficient of the two resized regions $R_1$ and $R_2$ may be determined in accordance with Equation (5), as follows:

$$c(R_1, R_2) = \frac{\sum_{i=1}^{n}(R_{1i} - \overline{R_1})(R_{2i} - \overline{R_2})}{\sqrt{\sum_{i=1}^{n}(R_{1i} - \overline{R_1})^2 \sum_{i=1}^{n}(R_{2i} - \overline{R_2})^2}} \quad (5)$$

where n represents the total number of pixels in each region, and $R_{mi}$ (i=[1, 2, ..., n], m=[1, 2]) represents the intensity value of pixel i in region m. Further, $\overline{R_m}$ (m=[1, 2]) is the average pixel value in region m and $c(R_1, R_2)$ is between −1 and 1.

If $c(R_1, R_2)$=1, the two regions $R_1$ and $R_2$ have the same intensity distribution, and if $c(R_1, R_2)$=−1 the two regions $R_1$ and $R_2$ have an inverse intensity distribution.

To determine the colour histograms of a region, each region may be converted to RGB colour space, and four (4) bins may be used for each colour channel. The colour histograms may be determined for each region, and Euclidean distance $d(R_1, R_2)$ of the two colour histograms is determined If $d(R_1, R_2)$=0 the two regions $R_1$ and $R_2$ have very similar colour distribution, and the larger the value of $d(R_1, R_2)$ is, the more different the two colour distributions are.

In one implementation, if $c(R_1, R_2)$ is larger than a pre-determined threshold $T_c$ and $d(R_1, R_2)$ is smaller than a pre-determined threshold $T_d$, the two regions $R_1$ and $R_2$ are determined as similar.

The subject regions and distracting regions identified in accordance with the method 300 have a wide range of applications. For example, the subject regions and distracting regions may be used for image auto-cropping, automatic image collaging, image quality assessment, or may be directly stored as metadata within the memory 1234 for later processing. In one implementation, the identified subject regions and distracting regions may be used for image enhancement.

The method 400 of modifying an image, as executed at step 109, will be described in more detail below with reference to FIG. 4. The method 400 may be implemented as one or more code modules of the software application program 1233 resident within the memory 1234 and being controlled in its execution by the processor 1205.

The method 400 begins at distracting region attenuation step 401, where the distracting regions in the target (or input) image stored within memory 1234 are modified by attenuating the distracting regions. The processor 1205 may be used for modifying image content of the distracting regions to de-emphasise appearance of the distracting regions in the target image. The modification of the image content may include reducing saliency level of the distracting regions of the target image. A method 500 of attenuating distracting regions, as executed at step 401, will be described in detail below with reference to FIG. 5. The modified target image may be stored within the memory 1234.

The method 400 continues at subject enhancement step 403, where the subjects of the target image stored within memory 1234 are modified to enhance the subjects based on the reference salient regions and/or the reference image. Again, the further modified target image may be stored within the memory 1234. A method 600 of modifying (or enhancing) subjects of an image, as executed at step 403, will be described in detail below with reference to FIG. 6A. Another method 650 of modifying (or enhancing) subjects of an image, which may alternatively be executed at step 403, will also be described in detail below with reference to FIG. 6B.

Figure 4:
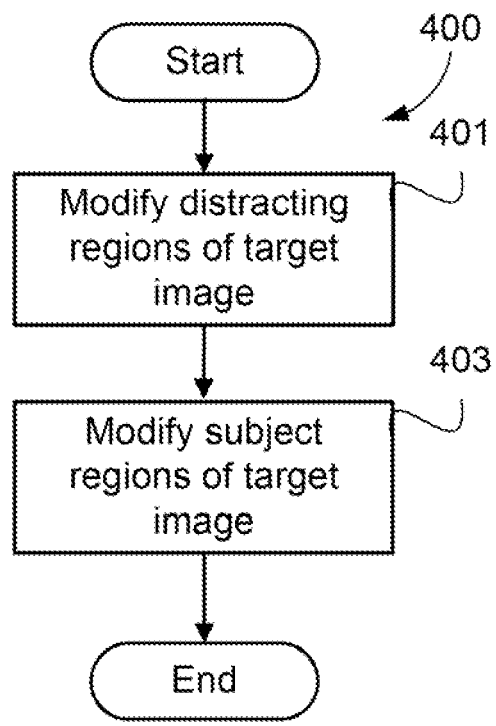
FIG. 4 is a schematic flow diagram showing a method of modifying an image, as executed in the method of FIG. 1.

Although steps 401 to 403 of the method 400 are shown in FIG. 4 as being executed sequentially, one or more steps of the method 400 may be executed in parallel. For example, steps 401 and 403 may be executed in parallel, one after the other, or only one of the steps 401 and 403 may be executed depending on requirements. Following steps 401 and 403 the modified target image representing a modified (or enhanced) version of the target (or input) image is stored within the memory 1234.

The method 500 of attenuating distracting regions, as executed at step 401, will be described in detail below with reference to FIG. 5. The method 500 may be implemented as one or more software code modules of the software application 1233 resident on the memory 1234 and being controlled in its execution by the processor 1205.

As described above, a distractor is represented by one or more regions that attract the attention of an observer of an image but is not the intended subject of the image. To attenuate the distracting regions, the saliency level of each distracting region is reduced so that the distracting region will attract less attention from the observer. The saliency of a region is induced by the difference between the region and neighbouring regions. In one implementation, features (or properties) that make distracting regions different from neighbouring regions of an image are identified. The processor 1205 may be used for determining similarity of one or more features (or properties) of at least one salient region identified in the input saliency map and at least one salient region identified in the reference saliency map.

Values of identified features may be modified so that the distracting regions of an image become less different from, or in other words, more similar to, neighbouring regions of the image, and thus less salient. A list of such features, L, such as colour saturation, luminance, and sharpness, may be predetermined and stored within memory 1234. The features (or properties) may be selected from the predetermined list L of features (or properties).

The method 500 begins at distracting region selection step 501, where the processor 1205 is used to select an unprocessed distracting region from the distracting regions of the target image. Then at salient feature identification step 503, the processor 1205 is used to identify features from the feature list L stored within memory 1234 that cause the saliency of the selected distracting region. The value of each feature $F_i$ ($F_i \in L$) in the feature list L is measured both in the selected distracting region and in a surrounding region of the distracting region. For example, let $F_i^D$ and $F_i^N$ denote the value of feature $F_i$ in the distracting region and the neighbouring region, respectively. If the difference between $F_i^D$ and $F_i^N$ is above a pre-determined threshold, then the feature $F_i$ is identified as a salient feature. The features identified in step 503 may be stored within the memory 1234 as a list of identified salient features SF.

After the list of salient features SF is identified for the selected distracting region in step 503, the processor 1205 is used to modify the feature values of the identified features in the distracting region of the target image stored within the memory 1234. Any suitable method may be used for modifying the feature values. For example, for each feature $F_i$ ($F_i \in SF$) in the distracting region, the value of $F_i$ may be increased by a pre-determined threshold (e.g. 5%), if $F_i^D < F_i^N$. Further, the value of $F_i$ may be decreased by a pre-determined threshold (e.g. 5%), if $F_i^D > F_i^N$. In one implementation, each identified salient feature $F_i$ may be modified at step 503 according to Equation. (6), below, so that the value of the feature $F_i$ is changed based on the difference between $F_i^D$ and $F_i^N$.

$$F_i^{D*} = F_i^D + w*(F_i^N - F_i^D) \qquad (6)$$

where $F_i^{D*}$ is the new value of the feature $F_i$ in the selected distracting region, and w is between 0 and 1, which controls the magnitude of the modification. If w=0, the value of $F_i^D$ does not change; if w=1, then $F_i^D$ is changed to $F_i^N$. In one implementation, w may be set to 0.5.

At decision step 505, if the processor 1205 is used to determine that each distracting region has been selected and processed as described above, then the method 500 concludes as each distracting region in the target (or input) image are attenuated.

The method 600 of modifying (or enhancing) subjects of an image, as executed at step 403, will be described in detail below with reference to FIG. 6A. The method 600 may be implemented as one or more code modules of the software application program 1233 resident within the memory 1234 and being controlled in its execution by the processor 1205.

A salient region in the reference image is a good example or a better version of the corresponding subject region of the target image. The method 600 modifies the subject regions of the target image based on corresponding reference salient regions so that the modified subject regions are more similar to the reference salient regions. The method 600 enhances the subject regions of the target image based on image properties in the reference salient regions. Similarly, the method 650 of FIG. 6B is an alternative method to the method 600.

The method 600 begins at step 601, where the processor 1205 is used to randomly select an unprocessed region from the subject regions of the target image stored within memory 1234. Alternatively, at step 601, the processor 1205 is used to select an unprocessed region from the subject regions of the target image based on a pre-determined order. For example, an unprocessed region may be selected from the subject regions according to the ascending order of the coordinate values of the centres of the salient region. In accordance with the method 300 of FIGS. 3A and 3B, a subject region is a salient region in the target (or input) image which is determined to be similar to a region in the reference salient regions. The region selected at step 601 may be denoted as $R_s$, and the similar region in the reference salient regions may be denoted as $R_r$.

For the subject region $R_s$ selected at step 601 and a corresponding similar reference salient region $R_r$, the image properties are compared in region property comparison step 603. Some image properties are predefined, such as colour saturation, sharpness, and contrast. At step 603, for each image property $P_i$, the processor 1205 is used to determine the image property values both in the subject region $R_s$ and the similar reference salient image $R_r$, respectively denoted as $P_i^s$ and $P_i^r$, and compares the two values. If image property value $P_i^s$ and image property value $P_i^r$ differ significantly (i.e., $|P_i^s - P_i^r| \geq T_i$, where |*| is the absolute value of *, and $T_i$ is a pre-determined threshold of each image property $P_i$), then the processor 1205 is used to determine that the image property $P_i$ needs to be modified in the subject region $R_s$. The processor 1205 is used to compare the predefined image properties between the subject region $R_s$ and the similar reference salient image $R_r$, and identifies the image properties that need to be modified.

Then at subject modification step 605, the processor 1205 is used to for modifying content of the target image in accordance with the identified property or properties of the target image. Magnitude of the modification of the identified property or properties is determined based on content of the reference image salient region $R_r$ and content of the target image. In particular, the identified image properties in the subject region $R_s$ in the target image stored within the memory 1234 are modified so that the subject region $R_s$ is more similar to the subject region in the reference image $R_r$.

Step 605 is similar to salient feature identification step 503. In one implementation, each identified image property P in the subject region $R_s$ may be modified in accordance with Equation (7), below:

$$P_i^{s*} = P_i^s + \alpha * (P_i^r - P_i^s) \quad (7)$$

where $P_i^{s*}$ is the new value of the image property $P_i$ in the subject region $R_s$, and $\alpha$ is between zero (0) and one (1), which controls the magnitude of the modification. If $\alpha=0$, the value of the image property $P_i^s$ does not change; if $\alpha=1$, then the value of the image property $P_i^s$ is changed to the value of the image property $P_i^r$. In one implementation, $\alpha$ is set to 0.25.

Alternatively, at step 605, the value of the image property $P_i$ is increased by a pre-determined amount (e.g. 5%), when $P_i^s < P_i^r$, and the value of the image property $P_i$ is decreased by a pre-determined amount (e.g. 5%), when $P_i^s > P_i^r$.

At decision step 607, if all of the subject regions of the target image are determined to have been processed, then the method 600 concludes. Otherwise, the method 600 returns to step 601, so that the processor 1205 may be used to iteratively select an unprocessed subject region from the subject regions of the target image and the repeat the region property comparison step 603 and the subject modification step 605 processes each selected region.

The method 650 of modifying (or enhancing) subjects of an image, which may be alternatively executed at step 403, will now be described with reference to FIG. 6B. Again, the method 650 may be implemented as one or more code modules of the software application program 1233 resident within the memory 1234 and being controlled in its execution by the processor 1205.

Figure 6A:
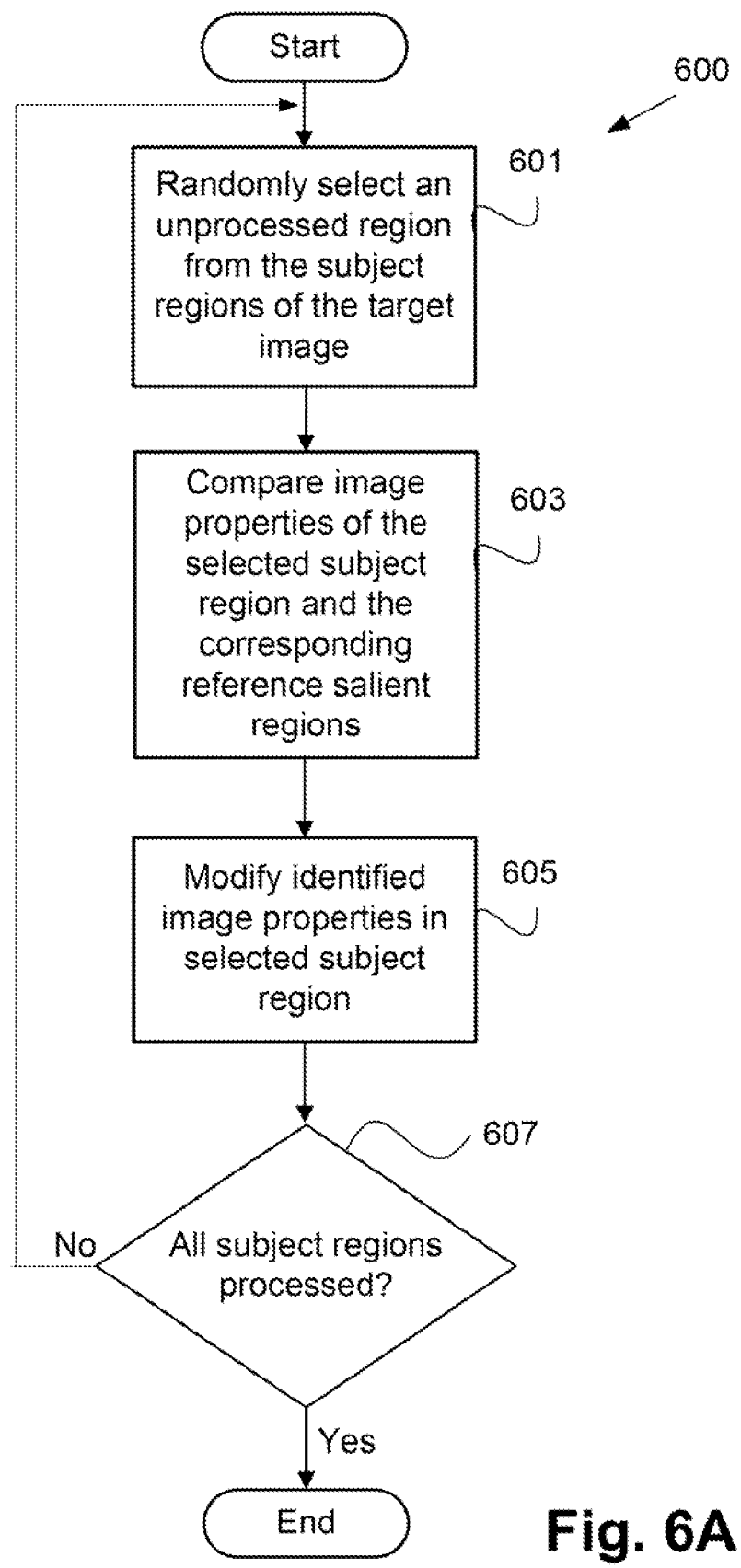
FIG. 6A is a schematic flow diagram showing a method of modifying subjects of an image as executed in the method of FIG. 4.
Figure 6B:
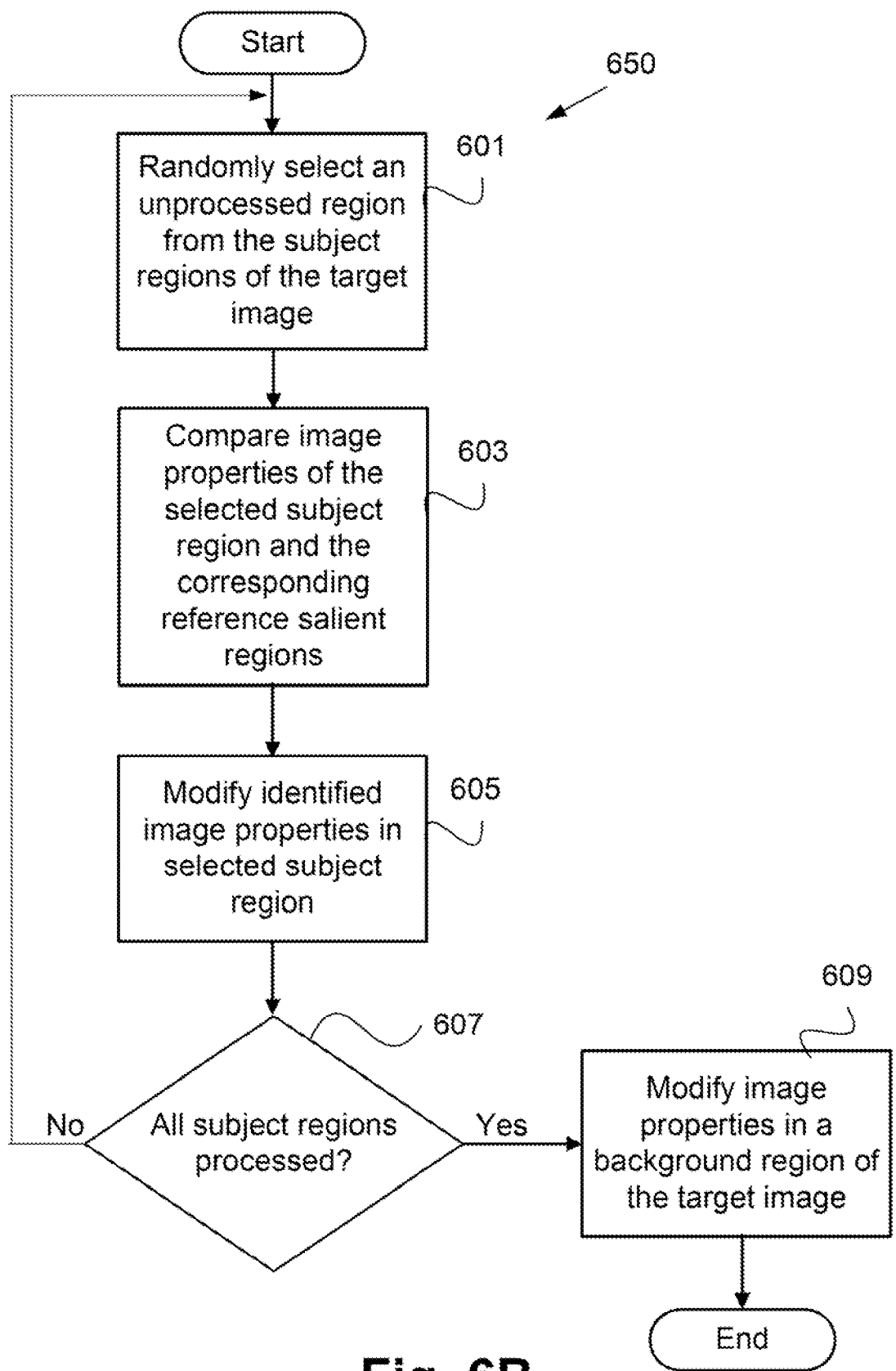
FIG. 6B is a schematic flow diagram showing another method of modifying subjects of an image as executed in the method of FIG. 4.

The method 650 is similar to the method 600 and includes steps 601 to 607 as seen in FIG. 6A. However, in the method 650, the processor 1205 is used for modifying a background region B of the target image in accordance with a property of the target image, where magnitude of the modification of the property is determined based on content of a non-salient region of the reference image and content the target image. As seen in FIG. 6B, after all the subject regions are modified in accordance with the steps 601 to 607 of the method 600, the method 650 proceeds to background modification step 609. At step 609, the processor 1205 is used to modify image properties in a background region B of the target (or input) image, based on the non-salient regions in the reference image. The background region B is defined as a non-subject region in the target image $\{B \in I | B \cap S = \emptyset\}$, where I is the target image, S is a union of the subject regions, and Ø is the null set.

$B \cap S = \emptyset$ means there are no overlapping regions/pixels between the background region B and the union of the subject regions S. Non-salient regions NS may be defined as $\{NS \in I_r | NS \cap S_r = \emptyset\}$, where $I_r$ is the reference image, and $S_r$ is the union of the reference salient regions. The background region B is modified in a similar manner to the modification of the subject regions at step 605. Some predefined image properties, such as the sharpness and contrast, are calculated and compared between the background region B and non-salient regions NS. If an image property differs significantly between the background region B and the non-salient region NS, the image property value in the background region B is modified so that the image property becomes more similar to the non-salient regions NS. After the background modification step 609, the background region of the target (or input) image is more similar to the non-salient regions of the reference image.

Figure 7:
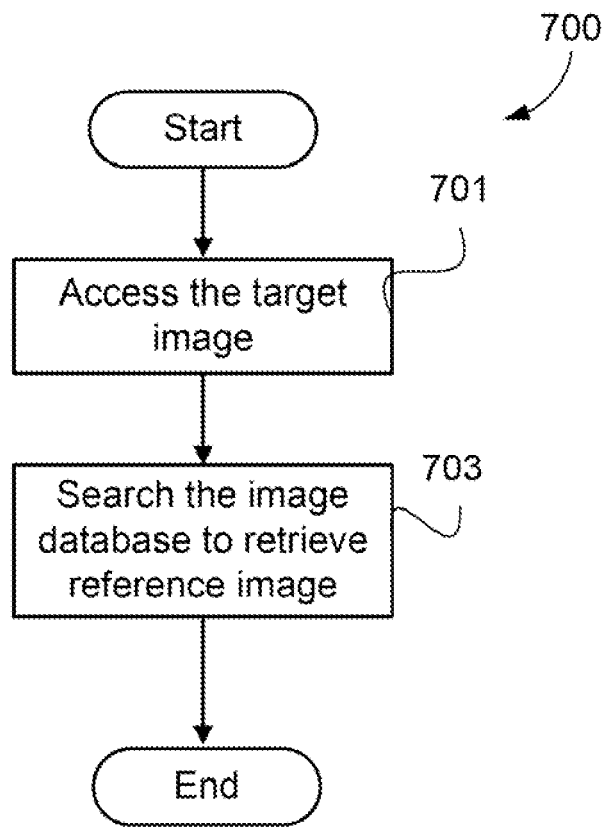
FIG. 7 is a schematic flow diagram showing a method of searching for a reference image for a target image.
Figure 8:
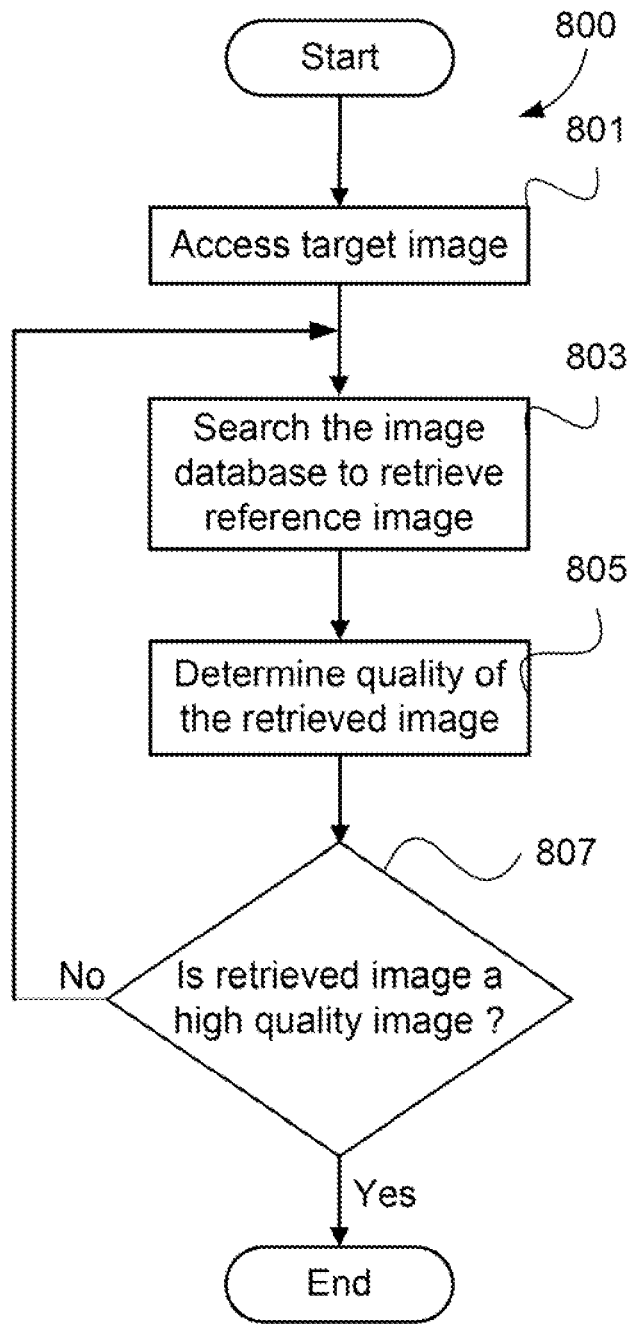
FIG. 8 is a schematic flow diagram showing another method of searching for a reference image for a target image.

A method 700 of searching for a reference image for the target image, will be described below with reference to FIG. 7. An alternative method 800 of searching for a reference image for the target image, will also be described below with reference to FIG. 8. The methods 700 and 800 may be used for automatically selecting a reference image for a target image.

The methods 700 and 800 use one or more image databases containing the reference images. The image databases may be configured within the memory 1234. Alternatively, the image databases may be publicly accessible image databases, or pre-constructed and strictly controlled image databases configured within one or more remote servers, for example, connected to the network 1220.

The type of image database used in implementing the methods 700 and 800 depends on the use of the methods 700 and 800. A publicly accessible image database may contain a vast number of images which cover a wide range of content, so that it is easier to determine a reference image with very similar content to the target (or input) image. A pre-constructed and strictly controlled image database may hardly reach the size of a publicly accessible image database. However, such a pre-constructed and strictly controlled image database may include high-quality images with strictly controlled image properties. Accordingly, the quality and image properties of the reference images stored within such a pre-constructed and strictly controlled image database is easier controlled.

Once either of the reference image retrieval methods 700 and 800 are executed to retrieve a reference image for the target image, the target image and the reference image may be used in the method 100 of modifying an image.

Each of the methods 700 and 800 use a different type of reference image database. For the method 700, the reference image database is a pre-constructed and strictly controlled image database containing high quality images configured, for example, within the memory 1234. For the method 800 of FIG. 8B, the image database is a publicly accessible image database configured, for example, within a remote server connected to the network 1220.

The method 700 may be implemented as one or more software modules of the software application program 1233 resident on the memory 1234 and being controlled in its execution by the processor 1205.

The method 700 begins at receiving step 701, where the processor 1205 is used to access the target image from the memory 1234. The target image may be used as an inquiry image.

At searching step 703, the processor 1205 is used to search the image database configured within the memory 1234 and retrieve an image as the reference image. Any suitable automatic image retrieval method may be used at step 703. In one implementation, a content-based image retrieval method may be used at step 703. For example, the image may be retrieved from the image database at step 703 based on content of the target image as described below.

Alternatively, a keyword-based image retrieval method may be used at step 703. In this instance, the reference image is retrieved from the image database at step 703 based on one or more search keywords associated with the reference image.

When executing a content-based image retrieval method at step 703, the processor 1205 is used to compare the similarity of visual features, such as colour distribution, corner/edge feature distribution, and object detection, between the target image (or inquiry image) and each image in the image database. The processor 1205 is used to retrieve from the image database one or more similar images to the target (or inquiry) image.

For a keyword-based image retrieval method, each image in the image database is associated with one or more keywords or tags. In this instance, at step 703, the processor 1205 is used to determine one or more keywords from the memory 1234. In one implementation, the keyword(s) may be provided by a user using the keyboard 1202, for example. The processor 1205 is used to retrieve the image(s) with the same or similar keyword(s)/tag(s) from the image database configured within the memory 1234. As described above, an image retrieval method or a content-based image retrieval method a keyword-based image retrieval method may be used at step 703. Alternatively, a combination of both a content-based image retrieval method and a keyword-based image retrieval method may be used to retrieve an image. Since the image database used at step 703 contains high-quality images, the retrieved image may be directly used as the reference image.

If a publicly accessible image database or an uncontrolled image database is used as the image database, then the method 800 of searching for a reference image for the target image, may be used. Again, the method 800 may be implemented as one or more software modules of the software application program 1233 resident on the memory 1234 and being controlled in its execution by the processor 1205.

The method 800 begins at receiving step 801, where the processor 1205 is used to access the target image from the memory 1234 for use as an inquiry image.

Then at searching step 803, the processor 1205 is used to search the image database (e.g., stored on a remote server connected to the network 1220), and retrieve an image as the reference image. Again, any suitable automatic image retrieval method may be used at step 803, including a content-based image retrieval method and a keyword-based image retrieval method. Since the image database used in the method 800 is an uncontrolled image database, the quality of the images in the image database is unknown. To ensure that the retrieved image is a high-quality image, the method 800 performs a quality check step 805 on the retrieved image to determine quality of the reference image. Step 805 will be described in detail below.

At decision step 807, if the retrieved image is identified as a high-quality image, then the retrieved image may be used as a reference image and the method 800 concludes. Otherwise, the method 800 returns to step 803 and another image is retrieved from the image database.

In one implementation, the processor 1205 may be used to analyse metadata associated with the retrieved image. The metadata of the retrieved image may include, for example, the model of the camera used to capture the image. In one implementation, images captured using a camera typically used by expert or experienced photographers, such as an SLR camera, are considered by the method 800 as high-quality. Furthermore, in some well-known public image databases, a well captured image may have many positive votes and/or high view counts (i.e. being viewed for many times or by many people) associated with the well captured image. Such well captured images may also receive many positive comments, such as 'Fantastic!', 'Nice Shot!', 'I like it.'.

In one implementation, at step 805 the metadata associated with the retrieved image, view counts associated with the retrieved image, positive votes associated with the retrieved image, and the number of comments associated with the retrieved image with keywords such as 'nice', 'like', and 'great', may be analysed. In this instance, an image is classified as a high-quality image at step 805 if the image is captured with a good camera, has high view counts, has many positive votes, and/or has many positive comments. Alternatively, any suitable computational image quality assessment algorithm may be used at step 805 to determine the quality of the retrieved image.

In one implementation, a plurality of images may be used as reference images. If the methods 700 and 800 retrieve more than one image, one of the retrieved images may be selected as the reference image. The selected image may be the image which is determined to have the highest image quality, or the image which is determined to be most similar to the target image either in relation to the content or in the keywords associated with the selected image, or in relation to a combination of both content and keywords associated with the selected image. Alternatively, the user may manually select the reference image from the retrieved images.

In one implementation, each high-quality image of the images retrieved in accordance with the methods 700 and 800 may be used as an independent reference image. The target image may modified (or enhanced) independently based on each reference image, which results in a plurality of modified enhanced target images being determined. In one implementation, the user may determine which modified (or enhanced) target image is subsequently selected.

In one implementation, a plurality of reference images may be used to modify the target image. In this instance, at step 603, aggregate information or mutual information from the reference images may be determined and used to modify the target image.

The methods described above will now be further described by way of example with reference to FIGS. 9A to 9F.

Figure 9C:
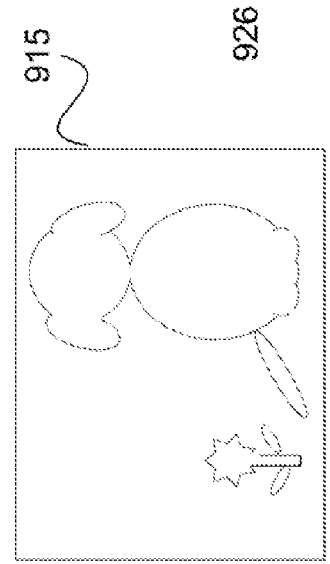
FIG. 9C shows an input saliency map determined for the example image of FIG. 9A in accordance with the method of FIG. 2A.
Figure 9D:
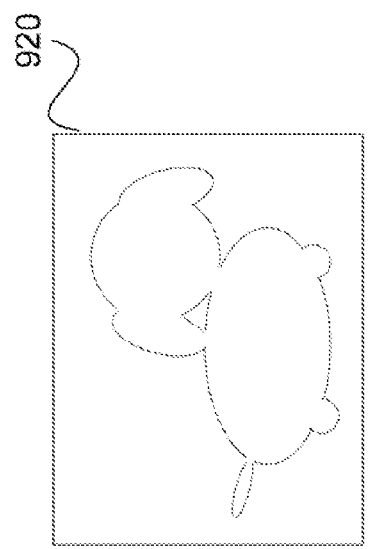
FIG. 9D shows a reference saliency map determined for the example image of FIG. 9B in accordance with the method of FIG. 2A.
Figure 9E:
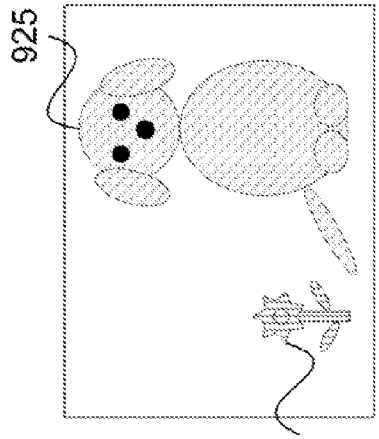
FIG. 9E shows input salient regions determined for the target image of FIG. 9A using the input saliency map of FIG. 9C.
Figure 9F:
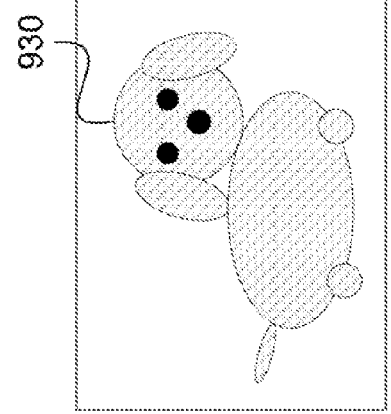
FIG. 9F shows reference salient regions determined for the target image of FIG. 9A using the reference saliency map of FIG. 9D.
Figure 9A:
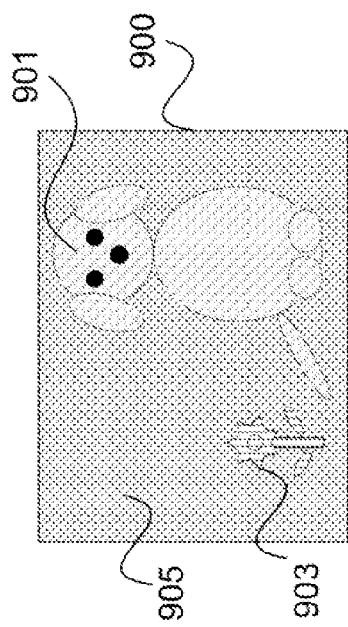
FIG. 9A shows an example image of a target image.

FIG. 9A shows a sketched example image 900 comprising a brown dog 901 and a red flower 903 against a green background 905, where the colours used in the image 900 are represented by shading as shown in FIGS. 9A to 9F.

Figure 9B:
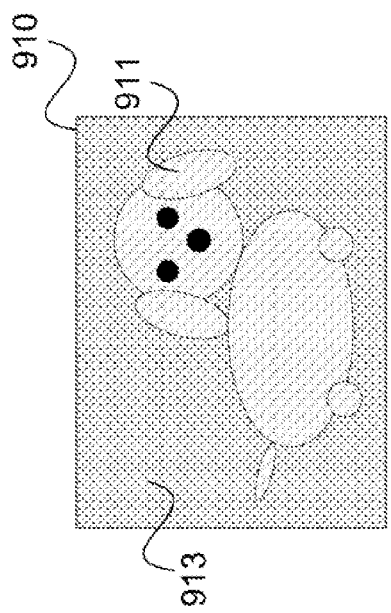
FIG. 9B shows an example reference image which may be used to modify the target image of FIG. 9A.

FIG. 9B shows a sketched example of a reference image 910 which may be used to enhance the target image 900. The reference image 910 is a photo of a brown dog 911 against a green background 913.

FIG. 9C and FIG. 9D respectively show an input saliency map 915 and a reference saliency map 920 determined for the image 900 in accordance with the method 200 of FIG. 2A.

According to the method 300 of FIGS. 3A and 3B, the salient regions are extracted from the target image 900 and the reference image 910. FIG. 9E shows input salient regions 925 and 926 determined for the target image 900 in accordance with the method 300. FIG. 9F shows a reference salient region 930 determined for the target image 900 in accordance with the method 300 of FIGS. 3A and 3B. As seen in FIG. 9E, two input salient regions 925 and 926 are determined for the image 900. Further, as seen in FIG. 9F, one (1) reference salient region 930 is determined for the target image 900 based on the reference image 910.

According to the method 300 of FIGS. 3A and 3B, each input salient region is compared with the reference salient regions at step 307 to determine if each compared input salient region is a distracting region or a subject region. In accordance with the present example, input salient region 926 is compared with the reference salient region 930, and is identified as a distractor, since the two regions 926 and 930 are determined to be different according to the method 300 of FIGS. 3A and 3B. Further, the input salient region 925 is compared with the reference salient region 930 and is identified as a subject region, since the two regions 925 and 930 are determined to be similar in accordance with the method 300 of FIGS. 3A and 3B.

Figure 5:
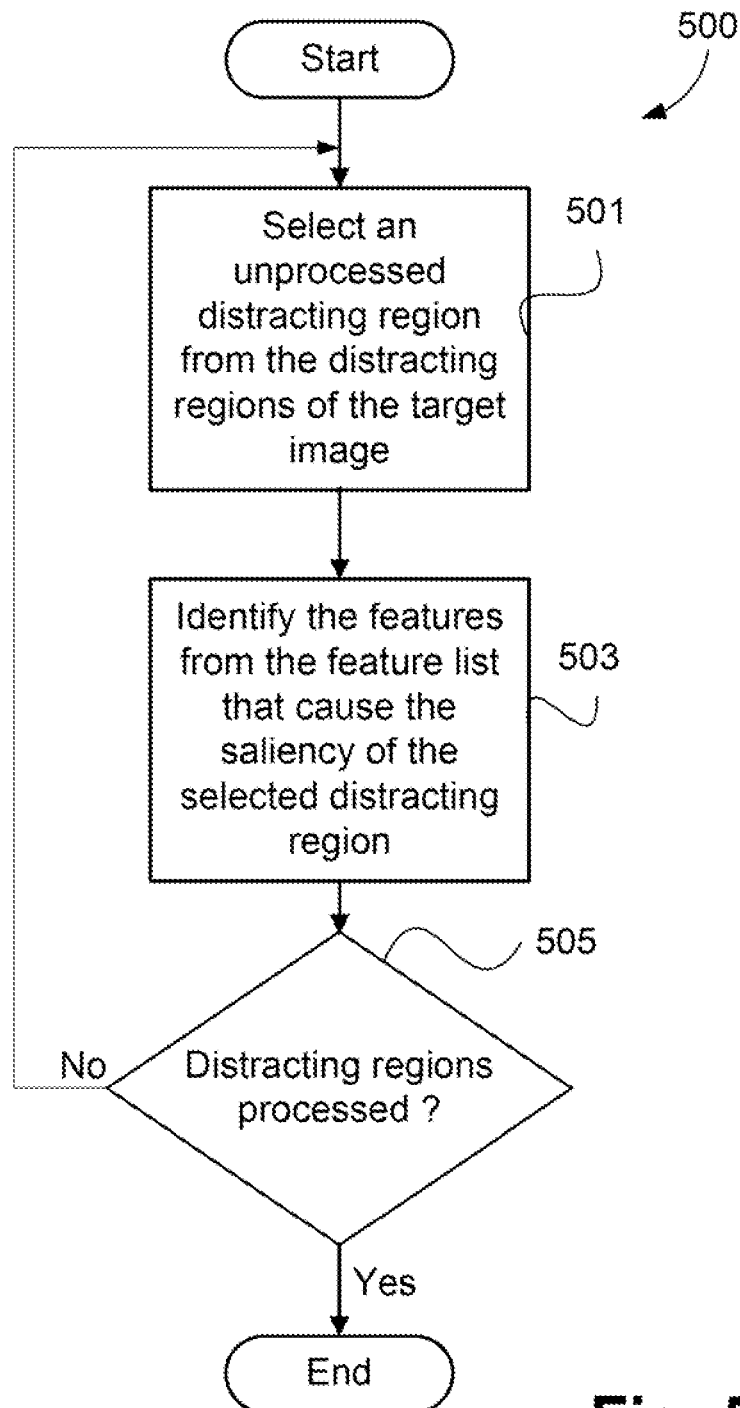
FIG. 5 is a schematic flow diagram showing a method of attenuating distracting regions as executed in the method of FIG. 4.
Figure 10A:
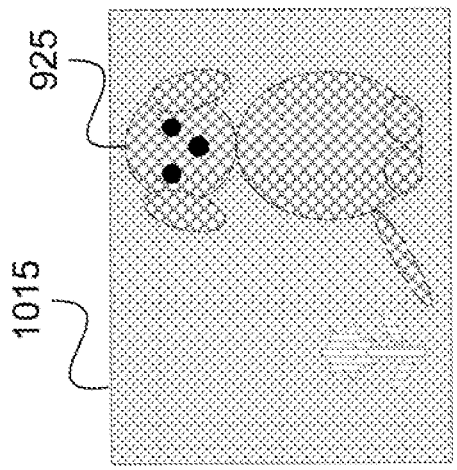
FIG. 10A shows a modified image determined for the example image of FIG. 9A in accordance with the method of FIG. 5.

FIG. 10A shows a modified image 1000 determined for the target image 900 by attenuating distracting region 926 in accordance with the method 500 as shown in FIG. 5. In accordance with the present example, colour saturation level of the region 926 is reduced so that the saliency level of the region 926 is reduced.

Figure 10B:
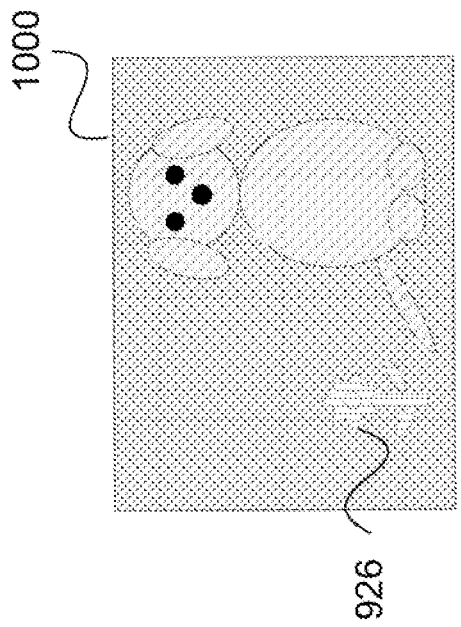
FIG. 10B shows a modified image determined for the example image of FIG. 9A in accordance with the method of FIG. 6A.

FIG. 10B shows a modified image 1015 determined for the target image 900 by enhancing the salient region 925 according to the method 600 of FIG. 6A.

Figure 10C:
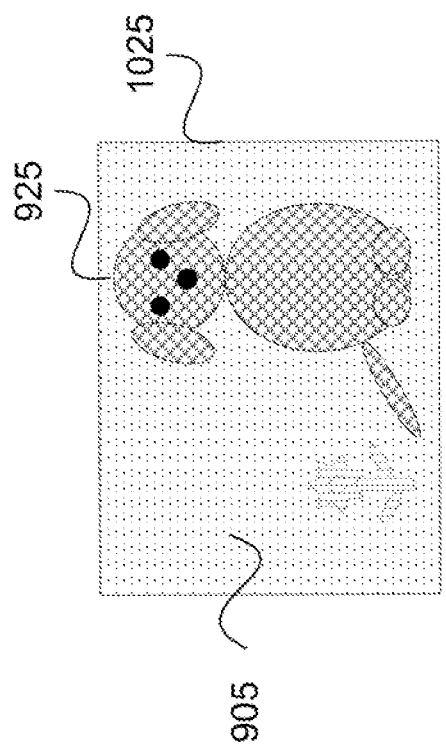
FIG. 10C shows a modified image determined for the example image of FIG. 9A in accordance with the method of FIG. 6B.

FIG. 10C shows a modified image 1025 determined for the target image 900 in accordance with the method 650 of FIG. 6B. In the example of FIG. 10C, image properties of the background 905 of the image 900 are modified as at step 609 of the method 650 of FIG. 6B. After the background 905 of the image 900 has been modified, the subject region 925 is more clearly presented.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A processor-implemented method of identifying a subject and a distractor in a target image, said method comprising:

receiving at least one reference image comprising image content corresponding to image content of the target image;

determining a first saliency map for the target image, said first saliency map defining a distribution of visual attraction values identifying salient regions within the target image;

determining a second saliency map for the reference image, said second saliency map defining a distribution of visual attraction values identifying salient regions within the reference image;

comparing image content in at least one salient region identified in the first saliency map with image content of at least one salient region identified in the second saliency map; and identifying the subject and the distractor in the target image based on the comparison, wherein the subject is identified by a salient region of the target image sharing image content with at least one salient region of the reference image, and wherein the distractor is identified based on at least one remaining salient region of the target image.

2. The method according to claim 1, wherein the reference image is provided by the user.

3. The method according to claim 1, wherein the reference image is automatically retrieved from an image database.

4. The method according to claim 3, wherein the reference image is retrieved from the image database based on content of the target image.

5. The method according to claim 3, wherein the reference image is retrieved from the image database based on one or more search keywords.

6. The method according to claim 1, wherein a plurality of images may be used as reference images, a saliency map is determined for each reference image, image content in at least one salient region identified in the first saliency map is compared with image content of at least one salient region identified in the saliency map determined for each reference image, and the subject and the distractor in the target image are identified based on the comparison.

7. The method according to claim 1, wherein each of the first and second saliency maps are region of interest maps.

8. The method according to claim 1, wherein each of the first and second saliency maps measure how strongly each part of the image attracts the attention of an observer.

9. The method according to claim 1, further comprising extracting salient regions from the target image based on the first saliency map.

10. The method according to claim 1, further comprising determining similarity of one or more properties of the at least one salient region identified in the first saliency map identified and at least one salient region identified in the second saliency map.

11. The method according to claim 10, wherein the properties are selected from a pre-determined list of properties.

12. The method according to claim 1, further comprising modifying a property of the image content of the target image with respect to the reference image, wherein magnitude of the modification of the property is determined based on content of the reference image salient region and content of the target image.

13. The method according to claim 1, further comprising modifying a property of a background of the target image with respect to the reference image, wherein magnitude of the modification of the property is determined based on content of a non-salient region of the reference image and content the target image.

14. The method according to claim 1, further comprising modifying image content of the distracting region to de-emphasise appearance of the distracting region in the target image.

15. The method according to claim 1, further comprising reducing saliency level of the distracting region of the target image.

16. A camera apparatus for identifying a subject and a distractor in a target image captured using the camera apparatus, said camera apparatus comprising:
   an input to receive at least one reference image comprising image content corresponding to image content of the target image;
   a memory having at least a program stored therein;
   a processor to execute the program to:
   determine a first saliency map for the target image, said first saliency map defining a distribution of visual attraction values identifying salient regions within the target image;
   determine a second saliency map for the reference image, said second saliency map defining a distribution of visual attraction values identifying salient regions within the reference image;
   compare image content in at least one salient region identified in the first saliency map with image content of at least one salient region identified in the second saliency map; and
   identify the subject and the distractor in the target image based on the comparison, wherein the subject is identified by a salient region of the target image sharing image content with at least one salient region of the reference image, and wherein the distractor is identified based on at least one remaining salient region of the target image.

17. A system for identifying a subject and a distractor in a target image, said system comprising:
   a memory for storing data and a computer program;
   a processor coupled to the memory for executing said computer program, said computer program comprising instructions for:
      receiving at least one reference image comprising image content corresponding to image content of the target image;
      determining a first saliency map for the target image, said first saliency map defining a distribution of visual attraction values identifying salient regions within the target image;
      determining a second saliency map for the reference image, said second saliency map defining a distribution of visual attraction values identifying salient regions within the reference image;
      comparing image content in at least one salient region identified in the first saliency map with image content of at least one salient region identified in the second saliency map; and
      identifying the subject and the distractor in the target image based on the comparison, wherein the subject is identified by a salient region of the target image sharing image content with at least one salient region of the reference image, and wherein the distractor is identified based on at least one remaining salient region of the target image.

18. A non-transitory computer readable storage medium having a computer program recorded thereon, the program being executable by a processor for identifying a subject and a distractor in a target image to perform the method comprising:
   receiving at least one reference image comprising image content corresponding to image content of the target image;
   determining a first saliency map for the target image, said first saliency map defining a distribution of visual attraction values identifying salient regions within the target image;
   determining a second saliency map for the reference image, said second saliency map defining a distribution of visual attraction values identifying salient regions within the reference image;
   comparing image content in at least one salient region identified in the first saliency map with image content of at least one salient region identified in the second saliency map; and
   identifying the subject of the target image based on the comparison, wherein the subject is identified by a salient region of the target image sharing image content with at least one salient region of the reference image, and wherein the distractor is identified based on at least one remaining salient region of the target image.

* * * * *